US012152499B1

(12) United States Patent
Thomas et al.

(10) Patent No.: US 12,152,499 B1

(45) Date of Patent: Nov. 26, 2024

(54) TURBINE SHROUD SEGMENTS WITH STRIP SEAL ASSEMBLIES HAVING DAMPENED ENDS

(71) Applicant: Rolls-Royce Corporation, Indianapolis, IN (US)

(72) Inventors: David J. Thomas, Indianapolis, IN (US); Ted J. Freeman, Indianapolis, IN (US); Aaron D. Sippel, Indianapolis, IN (US); Clark Snyder, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 0 days.

(21) Appl. No.: 18/528,726

(22) Filed: Dec. 4, 2023

(51) Int. Cl.

| | |
|---|---|
| ***F01D 11/08*** | (2006.01) |
| ***F01D 11/00*** | (2006.01) |
| ***F01D 25/24*** | (2006.01) |

(52) U.S. Cl.

CPC .......... *F01D 25/246* (2013.01); *F01D 11/003* (2013.01); *F05D 2240/11* (2013.01); *F05D 2240/14* (2013.01)

(58) Field of Classification Search

CPC ...... F01D 11/08; F01D 11/005; F01D 25/246; F05D 2220/32; F05D 2240/11; F05D 2240/55

See application file for complete search history.

(56) References Cited

U.S. PATENT DOCUMENTS

| | | | |
|---|---|---|---|
| 7,207,771 | B2 | 4/2007 | Synnott et al. |
| 7,217,089 | B2 | 5/2007 | Durocher et al. |
| 7,374,395 | B2 | 5/2008 | Durocher et al. |
| 7,513,740 | B1 | 4/2009 | Hervy et al. |
| 7,600,967 | B2 | 10/2009 | Pezzetti, Jr. et al. |
| 7,771,159 | B2 | 8/2010 | Johnson et al. |
| 7,901,186 | B2 | 3/2011 | Cornett et al. |
| 8,206,087 | B2 | 6/2012 | Campbell et al. |
| 8,303,245 | B2 | 11/2012 | Foster et al. |
| 8,641,371 | B2 | 2/2014 | Nakamura et al. |
| 8,651,497 | B2 | 2/2014 | Tholen et al. |
| 8,684,680 | B2 | 4/2014 | Martin et al. |
| 8,784,041 | B2 | 7/2014 | Durocher et al. |
| 8,845,285 | B2 | 9/2014 | Weber et al. |
| 8,905,708 | B2 | 12/2014 | Weber et al. |
| 9,079,245 | B2 | 7/2015 | Durocher et al. |
| 9,534,500 | B2 | 1/2017 | Bouchard et al. |
| 9,708,922 | B1 | 7/2017 | Davis et al. |

(Continued)

FOREIGN PATENT DOCUMENTS

| | | | |
|---|---|---|---|
| EP | 1965031 | A2 | 9/2008 |
| EP | 3543468 | A1 | 9/2019 |
| FR | 3056636 | A1 | 3/2018 |

*Primary Examiner* — David E Sosnowski

*Assistant Examiner* — Maxime M Adjagbe

(74) *Attorney, Agent, or Firm* — Barnes & Thornburg LLP

(57) ABSTRACT

A turbine shroud assembly for use with a gas turbine engine includes a first shroud segment, a second shroud segment, and a damping strip seal assembly. The first shroud segment has a first carrier segment arranged circumferentially at least partway around a central axis and a first blade track segment supported by the first carrier segment. The second shroud segment is arranged circumferentially adjacent the first shroud segment. The damping strip seal assembly includes an axial seal member, a forward seal, and an aft seal member.

19 Claims, 9 Drawing Sheets

(56) References Cited

U.S. PATENT DOCUMENTS 9,714,580 B2 7/2017 Slavens et al.
9,745,854 B2 8/2017 Baldiga et al.
9,759,079 B2 9/2017 Sippel et al.
9,863,265 B2 1/2018 Stapleton
9,863,323 B2 1/2018 Kirtley et al.
9,869,201 B2 1/2018 Dyson et al.
9,874,104 B2 1/2018 Shapiro
9,915,162 B2 3/2018 Duguay
9,945,484 B2 4/2018 Moehrle et al.
9,957,827 B2 5/2018 Davis et al.
9,982,550 B2 5/2018 Davis
9,988,919 B2 6/2018 Davis et al.
9,988,923 B2 6/2018 Snyder et al.
10,012,099 B2 7/2018 Cetel et al.
10,024,193 B2 7/2018 Shapiro
10,072,517 B2 9/2018 Boeke et al.
10,082,085 B2 9/2018 Thomas et al.
10,087,771 B2 10/2018 Mcgarrah
10,100,660 B2 10/2018 Sippel et al.
10,132,197 B2 11/2018 Heitman et al.
10,138,747 B2 11/2018 Dev et al.
10,138,750 B2 11/2018 Mccaffrey et al.
10,167,957 B2 1/2019 Davis et al.
10,202,863 B2 2/2019 Davis et al.
10,265,806 B2 4/2019 Cui et al.
10,281,045 B2 5/2019 Sippel et al.
10,301,955 B2 5/2019 Vetters et al.
10,301,960 B2 5/2019 Stapleton et al.
10,378,385 B2 8/2019 Tesson et al.
10,378,386 B2 * 8/2019 Roussille .............. F01D 11/025
10,415,426 B2 9/2019 Quennehen et al.
10,415,427 B2 9/2019 Quennehen et al.
10,422,241 B2 9/2019 Mccaffrey et al.
10,428,688 B2 10/2019 Quennehen et al.
10,428,953 B2 10/2019 Lutjen et al.
10,443,419 B2 10/2019 Thomas et al.
10,443,420 B2 10/2019 Sippel et al.
10,465,545 B2 11/2019 Cetel et al.
10,533,446 B2 1/2020 Barak et al.
10,550,706 B2 2/2020 Lutjen et al.
10,577,963 B2 3/2020 Mccaffrey
10,577,977 B2 3/2020 Baucco
10,584,605 B2 3/2020 Sippel et al.
10,590,803 B2 3/2020 Quennehen et al.
10,598,045 B2 3/2020 Tableau et al.
10,605,120 B2 3/2020 Quennehen et al.
10,619,517 B2 4/2020 Quennehen et al.
10,626,745 B2 4/2020 Roussille et al.
10,633,994 B2 4/2020 Barker
10,648,362 B2 5/2020 Groves, II et al.
10,655,495 B2 5/2020 Groves, II et al.
10,655,501 B2 5/2020 Lepretre et al.
10,662,794 B2 5/2020 Das
10,689,998 B2 6/2020 Stapleton et al.
10,690,007 B2 6/2020 Quennehen et al.
10,704,404 B2 7/2020 Shi et al.
10,718,226 B2 7/2020 Vetters et al.
10,724,399 B2 7/2020 Carlin et al.
10,731,494 B2 8/2020 Dev et al.
10,731,509 B2 8/2020 Correia et al.
10,738,643 B2 8/2020 Mccaffrey et al.
10,753,221 B2 8/2020 Barker et al.
10,787,924 B2 9/2020 Quennehen et al.
10,794,204 B2 10/2020 Fitzpatrick et al.
10,801,345 B2 10/2020 Clum et al.
10,801,349 B2 10/2020 Mccaffrey
10,815,807 B2 10/2020 Vantassel et al.
10,815,810 B2 10/2020 Barker et al.
10,830,357 B2 11/2020 Mccaffrey et al.
10,890,079 B2 1/2021 Propheter-Hinckley et al.
10,907,487 B2 2/2021 Zurmehly et al.
10,907,501 B2 2/2021 Filippi et al.
10,934,872 B2 3/2021 Tableau et al.
10,934,873 B2 3/2021 Sarawate et al.
10,968,761 B2 4/2021 Barker et al.
10,968,777 B2 4/2021 Propheter-Hinckley et al.
10,982,559 B2 4/2021 Filippi
11,002,144 B2 5/2021 Azad et al.
11,015,613 B2 5/2021 Kerns et al.
11,021,988 B2 6/2021 Tableau et al.
11,021,990 B2 6/2021 Filippi
11,028,720 B2 6/2021 Tableau et al.
11,041,399 B2 6/2021 Lutjen et al.
11,047,245 B2 6/2021 Mccaffrey
11,066,947 B2 7/2021 Sippel et al.
11,073,045 B2 7/2021 Sippel et al.
11,078,804 B2 8/2021 Tableau et al.
11,085,316 B2 8/2021 Barker et al.
11,085,317 B2 8/2021 Johnson et al.
11,105,215 B2 8/2021 Roy Thill et al.
11,111,794 B2 9/2021 Bitzko et al.
11,111,802 B2 9/2021 Propheter-Hinckley et al.
11,111,822 B2 9/2021 Tableau et al.
11,111,823 B2 9/2021 Jarrossay et al.
11,125,096 B2 9/2021 Clark et al.
11,125,098 B2 9/2021 Barker et al.
11,143,050 B2 10/2021 Roy Thill et al.
11,149,574 B2 10/2021 Laroche
11,174,747 B2 11/2021 Roy Thill et al.
11,174,795 B2 11/2021 Lutjen et al.
11,181,006 B2 11/2021 Smoke et al.
11,187,094 B2 11/2021 Feldmann et al.
11,215,064 B2 1/2022 Arbona et al.
11,215,065 B2 1/2022 Starr et al.
11,215,081 B2 1/2022 Schilling et al.
11,220,928 B1 * 1/2022 Baucco ..................... F02C 7/12
11,248,480 B2 2/2022 Thirumalai et al.
11,255,208 B2 2/2022 Clark et al.
11,255,209 B2 2/2022 Clark et al.
11,286,812 B1 3/2022 Freeman et al.
11,313,242 B2 4/2022 Cetel et al.
11,319,827 B2 5/2022 Clark et al.
11,319,828 B1 5/2022 Freeman et al.
11,326,463 B2 5/2022 Blaney et al.
11,326,470 B2 5/2022 Dyson et al.
11,346,237 B1 5/2022 Freeman et al.
11,346,251 B1 5/2022 Freeman et al.
11,365,635 B2 6/2022 Read et al.
11,441,434 B2 9/2022 Danis et al.
11,441,441 B1 9/2022 Freeman et al.
11,466,585 B2 10/2022 Arbona et al.
11,466,586 B2 10/2022 Sippel et al.
11,499,444 B1 11/2022 Freeman et al.
11,506,085 B2 11/2022 Jarrossay et al.
11,542,825 B2 1/2023 Hauswirth et al.
11,542,827 B2 1/2023 Quennehen et al.
11,624,291 B2 4/2023 Roy Thill et al.
11,624,292 B2 4/2023 Clark et al.
11,629,607 B2 4/2023 Freeman et al.
11,643,939 B2 5/2023 Stoyanov et al.
11,702,948 B2 7/2023 Hock et al.
11,702,949 B2 7/2023 Freeman et al.
11,713,694 B1 8/2023 Freeman et al.
11,732,604 B1 8/2023 Freeman et al.
11,761,351 B2 9/2023 Freeman et al.
11,773,751 B1 10/2023 Freeman et al.
11,781,440 B2 10/2023 Vincent et al.
11,781,448 B1 10/2023 Holleran
11,840,930 B2 12/2023 Propheter-Hinckley et al.
11,840,936 B1 12/2023 Freeman et al.
11,879,349 B2 1/2024 Schilling et al.
2021/0108532 A1 * 4/2021 Freeman ............... F01D 25/246
2023/0184124 A1 6/2023 Stoyanov et al.
2023/0332506 A1 10/2023 Freeman et al.
2024/0003267 A1 1/2024 Cazin et al.

* cited by examiner

TURBINE SHROUD SEGMENTS WITH STRIP SEAL ASSEMBLIES HAVING DAMPENED ENDS

FIELD OF THE DISCLOSURE

The present disclosure relates generally to turbine shroud segments, and more specifically to sealing turbine shroud segments used with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds are made up of a number of segments arranged circumferentially adjacent to one another to form a ring. Such shrouds may include sealing elements between segments to block air from leaking through the segments during operation of the gas turbine engine.

SUMMARY

The present disclosure may comprise one or more of the following features and combinations thereof.

A turbine shroud assembly for use with a gas turbine engine may comprise a first shroud segment, a second shroud segment, and a damping strip seal assembly. The first shroud segment may include a first carrier segment and a first blade track segment. The first carrier segment may be arranged circumferentially at least partway around a central axis. The first blade track segment may be supported by the first carrier segment to define a portion of a gas path of the turbine shroud assembly. The first carrier segment may have a first outer wall, a first flange, and a second flange. The first flange may extend radially inward from the first outer wall. The second flange may be axially spaced apart from the first flange and may extend radially inward from the first outer wall.

In some embodiments, the second shroud segment may be arranged circumferentially adjacent the first shroud segment about the central axis. The second shroud segment may include a second carrier segment and a second blade track segment supported by the second carrier segment to define another portion of the gas path of the turbine shroud assembly. The second carrier segment may have a second outer wall, a first flange, and a second flange. The first flange may extend radially inward from the second outer wall. The second flange may be axially spaced apart from the first flange of the second carrier segment and may extend radially inward from the second outer wall.

In some embodiments, the damping strip seal assembly may extend circumferentially into the first shroud segment and the second shroud segment to block gases from passing radially between the first shroud segment and the second shroud segment. The damping strip seal assembly may include an axial seal member, a forward seal member, and an aft seal member. The axial seal member may extend axially along a first radial outer surface of the first blade track segment and a second radial outer surface of the second blade track segment. The forward seal member may extend into the first flange of the first carrier segment and may engage the axial seal member. The aft seal member may extend into the second flange of the first carrier segment and may engage the axial seal member such that the forward seal member and the aft seal member urge the axial seal member radially inward against the first blade track segment and the second blade track segment to dampen flutter movement of the axial seal member.

In some embodiments, the forward seal member may include a first portion and a second portion. The first portion may engage a radial outer surface of the axial seal member. The second portion may extend radially outward from the first portion into a first seal-retaining slot formed in the first flange of the first carrier segment. The first portion may extend along a first curved path axially forward and radially outward and the second portion may extend along a first straight path radially outward from the first portion. The aft seal member may include a first portion and a second portion. The first portion may engage the radial outer surface of the axial seal member. The second portion may extend radially outward from the first portion into a second seal-retaining slot formed in the second flange of the first carrier segment. The first portion may extend along a second curved path axially aft and radially outward and the second portion may extend along a second straight path radially outward from the first portion.

In some embodiments, the axial seal member may be formed to include a retention tang extending radially outward from the axial seal member at an aft end of the axial seal member to engage an aft wall of the second flange of the first carrier segment. The forward seal member may extend along a first curved path axially aft as the forward seal member extends radially inward toward the axial seal member. The aft seal member may be S-shaped and may be defined by a first axially-extending portion, a curved portion, and a second axially-extending portion. The first axially-extending portion may engage a radial outer surface of the axial seal member. The curved portion may extend radially outward and axially aft from the first axially-extending portion. The second axially-extending portion may extend axially aft from the curved portion. At least a portion of the curved portion and the second axially-extending portion may extend into the second flange of the first carrier segment.

In some embodiments, the forward seal member may include a first portion and a second portion. The first portion may extend along a first straight path radially outwardly away from the axial seal member. The second portion may extend along a curved path radially outward and axially aft from the first portion. The aft seal member may be S-shaped and may be defined by a first axially-extending portion, a curved portion, and a second axially-extending portion. The first axially-extending portion may engage a radial outer surface of the axial seal member. The curved portion may extend radially outward and axially aft from the first axially-extending portion. The second axially-extending portion may extend axially aft from the curved portion. At least a portion of the curved portion and the second axially-extending portion may extend into the second flange of the first carrier segment.

In some embodiments, at least a portion of the forward seal member may extend into the first flange of the first carrier segment and into the first flange of the second carrier segment. A radially outer end of the forward seal member may engage the first flange of the first carrier segment without engaging the first flange of the second carrier segment. The first flange of the first carrier segment may include a first wall and a first protrusion that extends radially inward from the first wall to cover a first axial end of the first blade track segment. The first wall may be formed to include a radial inward facing surface and a first seal-retaining slot extends radially outward into the first flange of the first carrier segment from the radially inward facing surface to receive at least a portion of the forward seal member therein.

In some embodiments, the first carrier segment may include a third flange and a fourth flange. The third flange may extend radially inward from the first outer wall. The fourth flange may be axially spaced apart from the third flange and may extend radially inward from the first outer wall. The third flange may be located axially between the first flange and the fourth flange. The fourth flange may be located axially between the third flange and the second flange. The first shroud segment may include a first retainer that extends through the first carrier segment and through the first blade track segment so as to couple the first blade track segment to the first carrier segment.

In some embodiments, the first blade track segment may include a first shroud wall that extends circumferentially partway around the central axis and a first attachment feature that extends radially outward from the first shroud wall. A circumferential end of the first shroud wall may be formed with a first recess to define a first shoulder that provides the first radial outer surface of the first blade track segment. The second blade track segment may include a second shroud wall that extends circumferentially partway around the central axis and a second attachment feature that extends radially outward from the second shroud wall. A circumferential end of the second shroud wall may be formed with a second recess to define a second shoulder that provides the second radial outer surface of the second blade track segment. The axial seal member of the damping strip seal assembly may engage the first shoulder and the second shoulder.

According to another aspect of the present disclosure, a turbine shroud assembly for use with a gas turbine engine may comprise a first shroud segment, a second shroud segment, and a damping strip seal assembly. The first shroud segment may include a first carrier segment and a first blade track segment. The first carrier segment may be arranged circumferentially at least partway around a central axis. The first blade track segment may be coupled with the first carrier segment to define a portion of a gas path of the turbine shroud assembly. The first carrier segment may have an outer wall, a first flange, and a second flange. The first flange may extend radially inward from the outer wall. The second flange may be axially spaced apart from the first flange and may extend radially inward from the outer wall. The second shroud segment may include a second carrier segment arranged circumferentially at least partway around a central axis and a second blade track segment supported by the second carrier segment.

In some embodiments, the damping strip seal assembly may include an axial seal member, a forward seal member, and an aft seal member. The axial seal member may engage a radial outer surface of the first blade track segment. The forward seal member may extend into the first flange of the first carrier segment and may engage a radial outer surface of the axial seal member. The aft seal member may extend into the second flange of the first carrier segment and may engage the radial outer surface of the axial seal member to urge the axial seal member radially inward toward the radial outer surface of the first blade track segment.

In some embodiments, the forward seal member may include a first portion that engages the radial outer surface of the axial seal member and a second portion that extends radially outward from the first portion. The first portion may extend along a first curved path axially forward and radially outward. The second portion may extend along a first straight path radially outward from the first portion. The aft seal member may include a first portion and a second portion. The first portion may engage the radial outer surface of the axial seal member. The second portion may extend radially outward from the first portion. The first portion may extend along a second curved path axially aft and radially outward. The second portion may extend along a second straight path radially outward from the first portion.

In some embodiments, the axial seal member may be formed to include a retention tang extending radially outward from the axial seal member at an aft end of the axial seal member to engage an aft wall of the second flange of the first carrier segment. The forward seal member may extend along a first curved path axially aft as the forward seal member extends radially inward toward the axial seal member. The aft seal member may be defined by a first axially-extending portion, a curved portion, and a second axially-extending portion. The first axially-extending portion may engage the radial outer surface of the axial seal member. The curved portion may extend radially outward and axially aft from the first axially-extending portion. The second axially-extending portion may extend axially aft from the curved portion. At least a portion of the curved portion and the second axially-extending portion may extend into the second flange of the first carrier segment.

In some embodiments, the forward seal member may include a first portion and a second portion. The first portion may extend along a first straight path radially outwardly away from the axial seal member. The second portion may extend along a curved path radially outward and axially aft from the first portion. The aft seal member may be defined by a first axially-extending portion, a curved portion, and a second axially-extending portion. The first axially-extending portion may engage the radial outer surface of the axial seal member. The curved portion may extend radially outward and axially aft from the first axially-extending portion. The second axially-extending portion may extend axially aft from the curved portion. At least a portion of the curved portion and the second axially-extending portion may extend into the second flange of the first carrier segment. The first flange of the first carrier segment may include a first wall and a first protrusion that extends radially inward from the first wall to cover a first axial end of the first blade track segment. The first wall may be formed to include a radial inward facing surface and a first seal-retaining slot may extend radially outward into the first flange of the first carrier segment from the radially inward facing surface to receive at least a portion of the forward seal member therein.

A method of assembling a turbine shroud assembly for use with a gas turbine engine may comprise assembling a first shroud segment by coupling a first blade track segment with a first carrier segment to support the first blade track segment radially inward of the first carrier segment. The method may comprise assembling a second shroud segment by coupling a second blade track segment with a second carrier segment to support the second blade track segment radially inward of the second carrier segment. The method may comprise providing a damping strip seal assembly that includes an axial seal member, a forward seal member, and an aft seal member. The method may comprise locating the axial seal member of the damping strip seal assembly on a first radial outer surface of the first blade track segment and a second radial outer surface of the second blade track segment. The method may comprise sliding the forward seal member of the damping strip seal assembly into a first seal-retaining slot formed in a first flange of the first carrier segment so that the forward seal member engages the first flange of the first carrier segment.

In some embodiments, the method may comprise sliding the aft seal member of the damping strip seal assembly into a second seal-retaining slot formed in a second flange of the first carrier segment so that the aft seal member engages the second flange of the first carrier segment. The method may comprise urging the axial seal member of the damping strip seal assembly radially inward against the first blade track segment and the second blade track segment through engagement of the forward seal member with the first flange and the aft seal member with the second flange. The method may comprise inserting a first retainer axially forward through the first carrier segment and the first blade track segment so as to couple the first blade track segment with the first carrier segment.

These and other features of the present disclosure will become more apparent from the following description of the illustrative embodiments.

DETAILED DESCRIPTION

Figure 1:
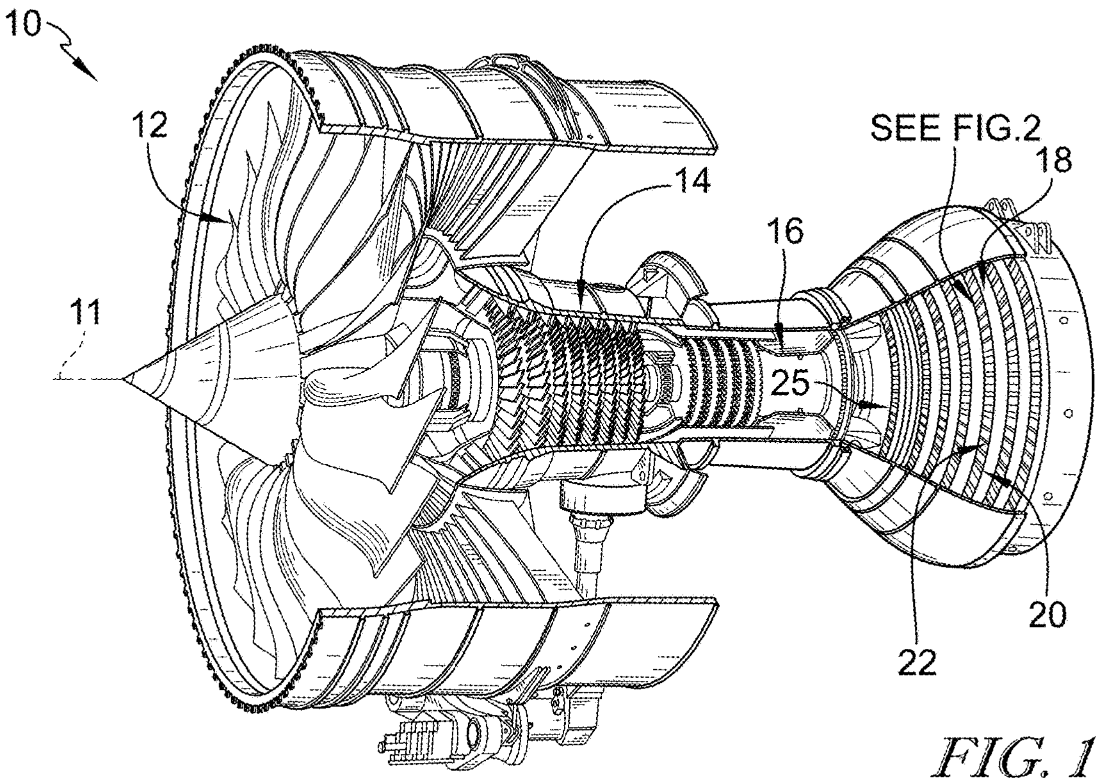
FIG. 1 is a cutaway perspective view of a gas turbine engine that includes a fan, a compressor, a combustor, and a turbine, the turbine including a turbine shroud assembly that extends circumferentially around an axis of the gas turbine engine and turbine wheel assemblies that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan 12 may be replaced with a propeller, drive shaft, or other suitable configuration.

Figure 2:
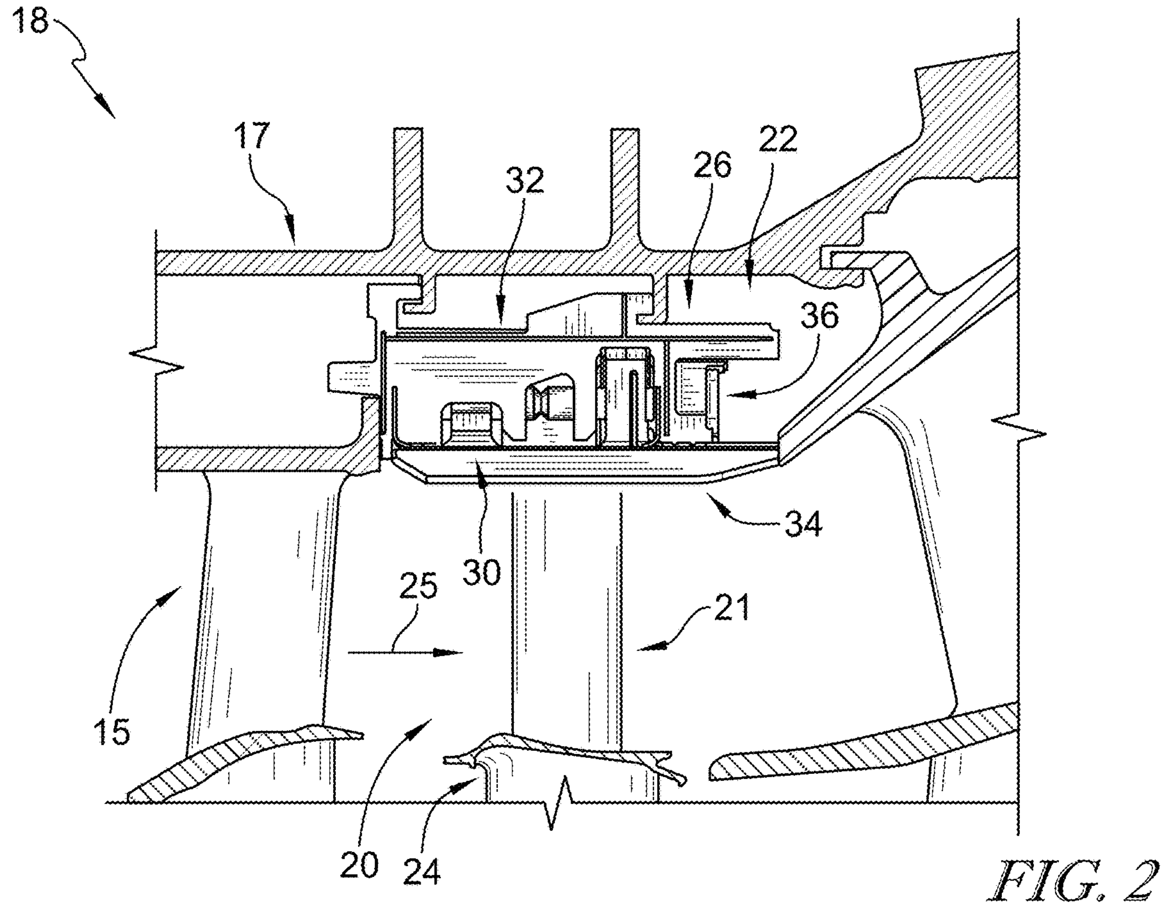
FIG. 2 is a cutaway perspective view of a portion of the turbine shroud assembly of FIG. 1 showing one of the turbine wheel assemblies and a first shroud segment of a plurality of shroud segments arranged around the turbine wheel assembly, the first shroud segment including a first carrier segment, a first blade track segment that defines a portion of a gas path of the turbine, and a first retainer that couples the first blade track segment with the first carrier segment, and further showing that strip seals of the turbine shroud assembly extend circumferentially into the first carrier segment and engage a radial outer surface of the first blade track segment to block gases from passing between the first shroud segment and a circumferentially adjacent second shroud segment.

The turbine 18 includes at least one turbine wheel assembly 20 and a turbine shroud assembly 22 positioned to surround the turbine wheel assembly 20 as shown in FIGS. 1 and 2. The turbine wheel assembly 20 includes a plurality of blades 21 coupled to a rotor disk 24 for rotation with the rotor disk 24. The hot, high-pressure combustion products from the combustor 16 are directed toward the blades 21 of the turbine wheel assemblies 20 along a gas path 25. The turbine wheel assembly 20 further includes a plurality of vanes 15 as shown in FIG. 2. The turbine shroud assembly 22 is coupled to an outer case 17 of the gas turbine engine 10 and extends around the turbine wheel assembly 20 to block gases from passing over the blades 21 during use of the turbine 18 in the gas turbine engine 10.

Figure 4:
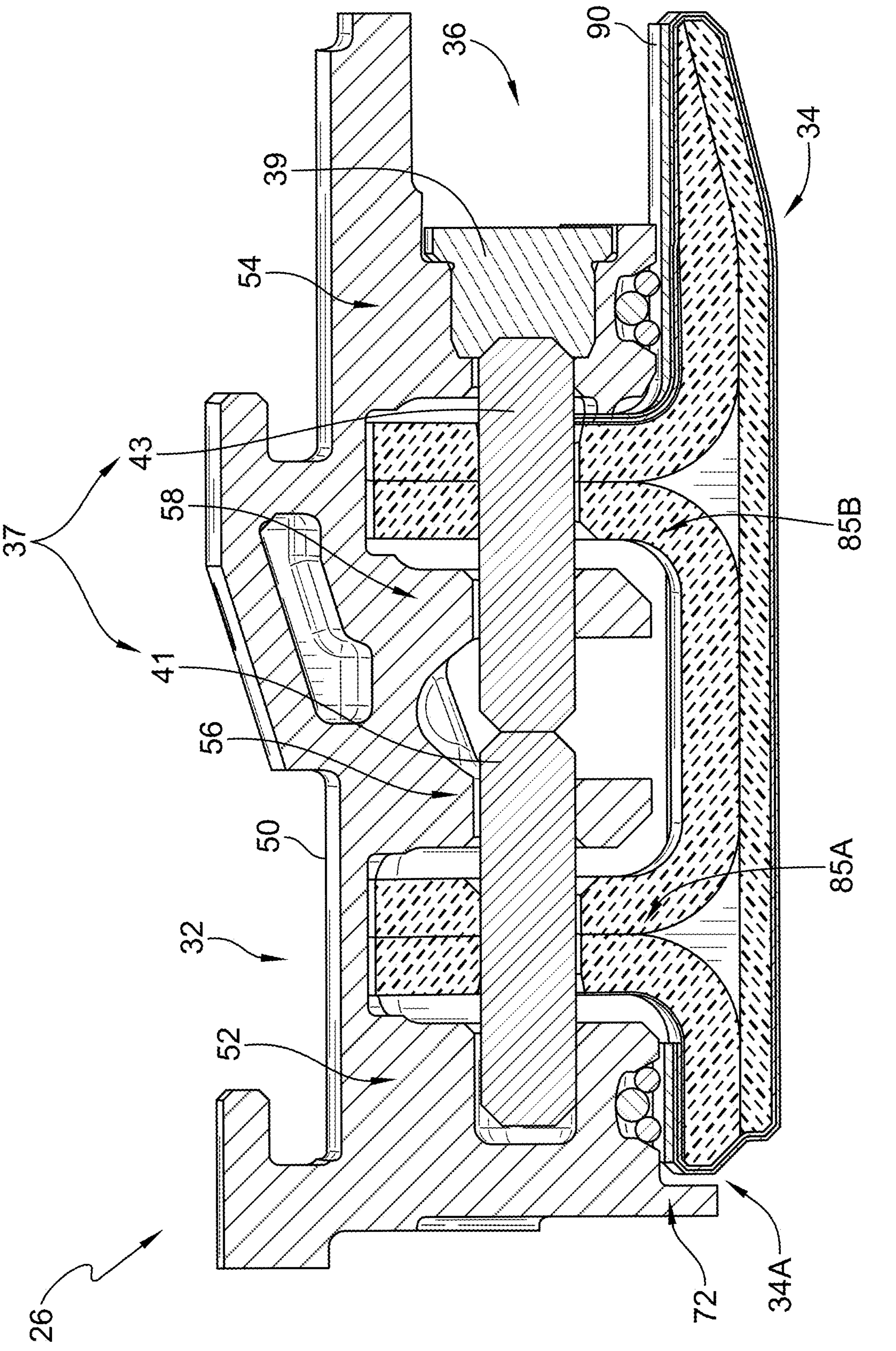
FIG. 4 is a cross-sectional view of the turbine shroud assembly of FIG. 3 showing that the first carrier segment includes an outer wall, a first flange that extends radially inward from the outer wall, and a second flange axially spaced apart from the first flange that extends radially inward from the outer wall, and further showing that the first retainer extends through the first blade track segment and the first carrier segment to couple the first blade track segment to the first carrier segment.
Figure 5:
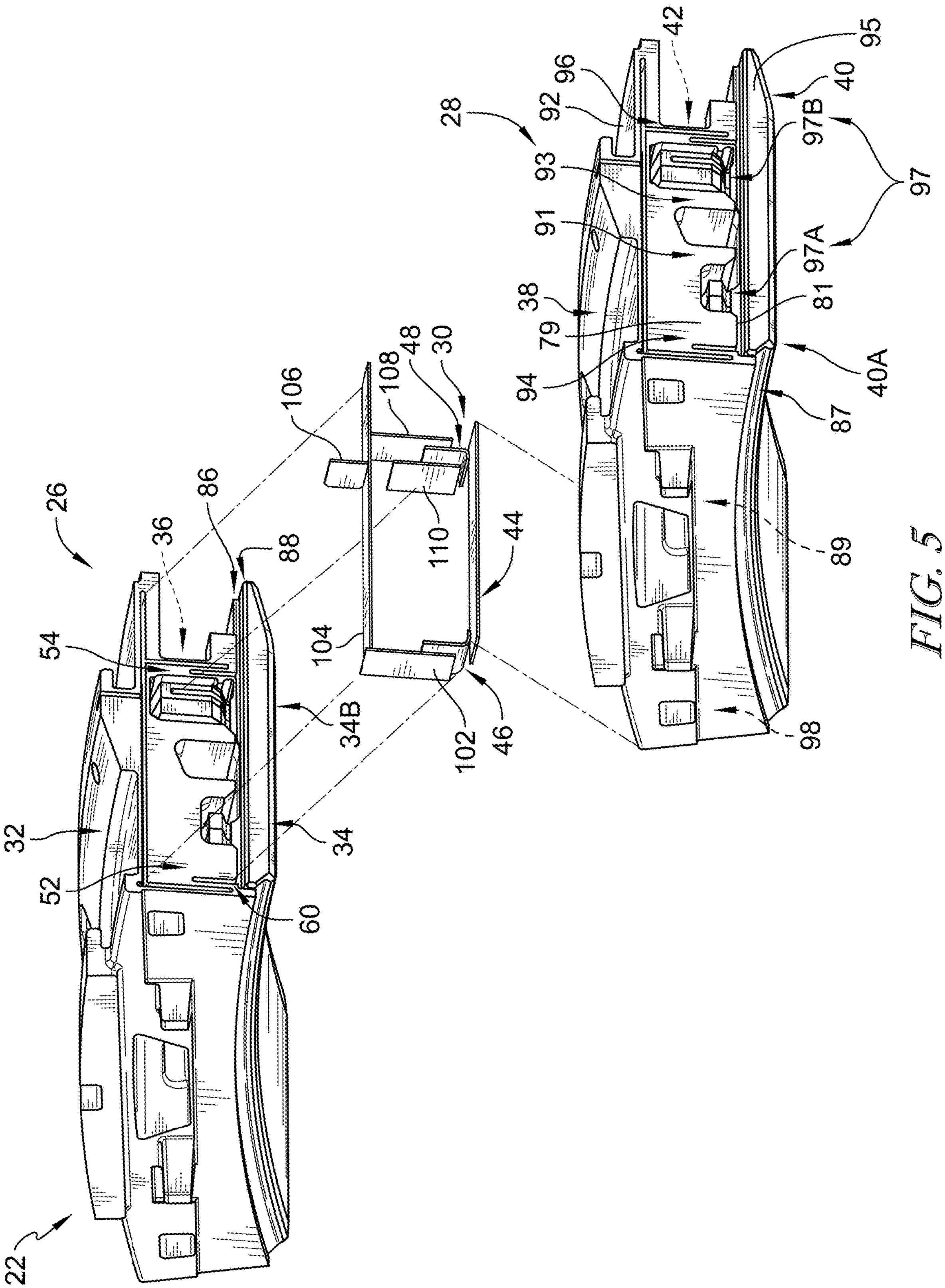
FIG. 5 is an exploded view of the first and second shroud segments used in the gas turbine engine of FIG. 1 showing the first shroud segment and the second shroud segment spaced apart from the first shroud segment, the second shroud segment including a second carrier segment and a second blade track segment supported by the second carrier segment, and further suggesting that the damping strip seal assembly extends circumferentially into the first shroud segment and the second shroud segment to block gases from passing between the first shroud segment and the second shroud segment.

The turbine shroud assembly 22 includes a plurality of shroud segments and a plurality of strip seals between adjacent shroud segments as suggested in FIGS. 2 and 5. Of the plurality of shroud segments, a first shroud segment 26 and a second shroud segment 28 are discussed in detail below. Likewise, a damping strip seal assembly 30 included in the plurality of strip seals used in the turbine shroud assembly 22 is shown in FIGS. 2-5. The first shroud segment 26, the second shroud segment 28, and the damping strip seal assembly 30 are representative of other adjacent shroud segments included in the turbine shroud assembly 22.

Figure 3:
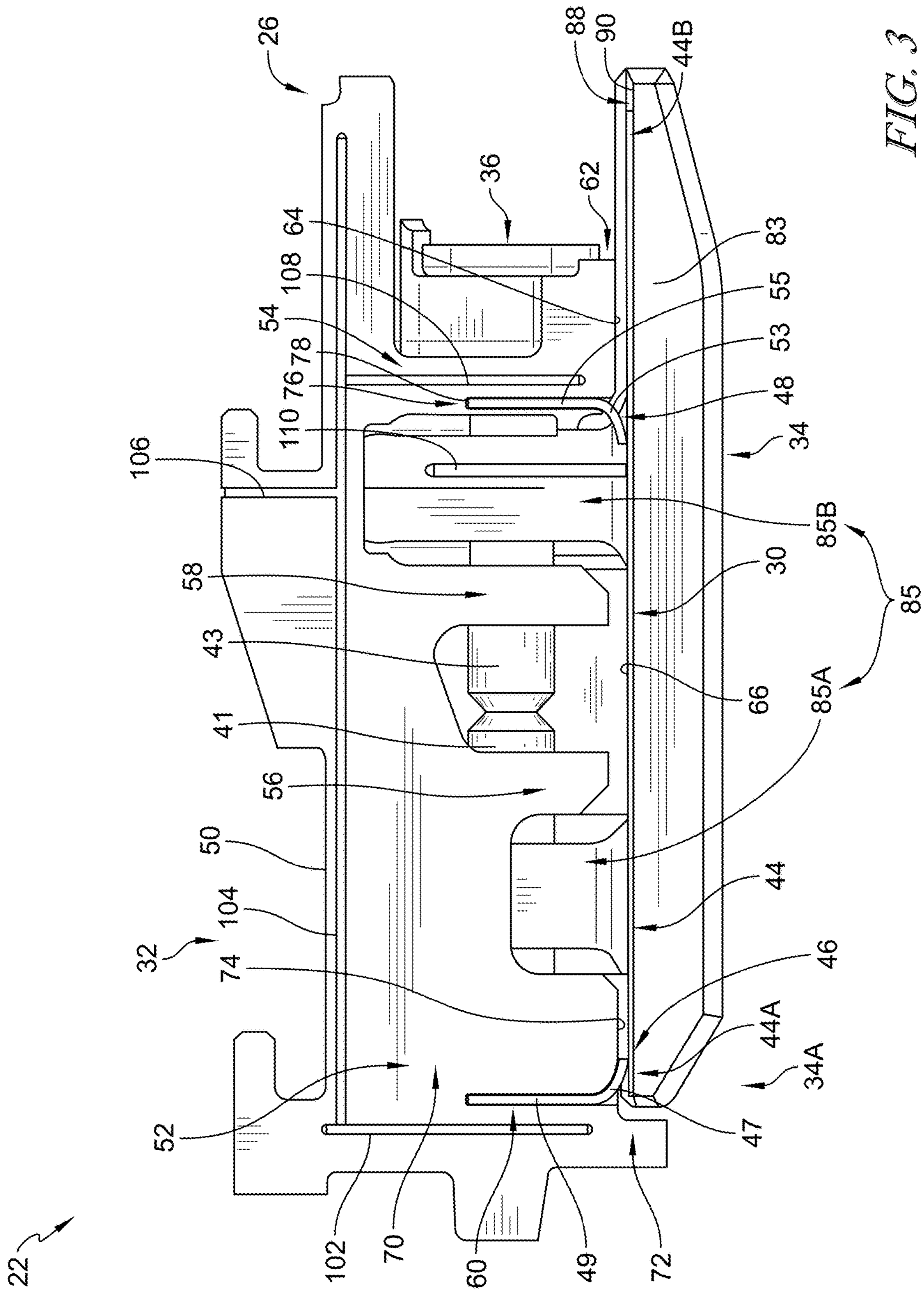
FIG. 3 is a side elevation view of the turbine shroud assembly of FIG. 2 showing that the strip seals include a damping strip seal assembly that includes an axial seal member that extends axially along the radial outer surface of the first blade track segment, a forward seal member that extends into the first carrier segment and engages the axial seal member, and an aft seal member that extends into the first carrier segment and engages the axial seal member to urge the axial seal member radially inward against the first blade track segment to dampen flutter movement of the axial seal member relative to the first shroud segment.

The plurality of strip seals in the illustrative embodiment includes strip seals 102, 104, 106, 108, 110 as shown in FIGS. 3 and 5. Any of the strip seals 102, 104, 106, 108, 110 may be included or omitted from the plurality of strip seals. The strip seals 102, 104, 106, 108, 110 are representative of more conventional strip seals. The damping strip seal assembly 30 includes a forward seal member 46 and an aft seal member 48 that urge the damping strip seal assembly 30 radially inward as suggested in FIG. 3.

Figure 6:
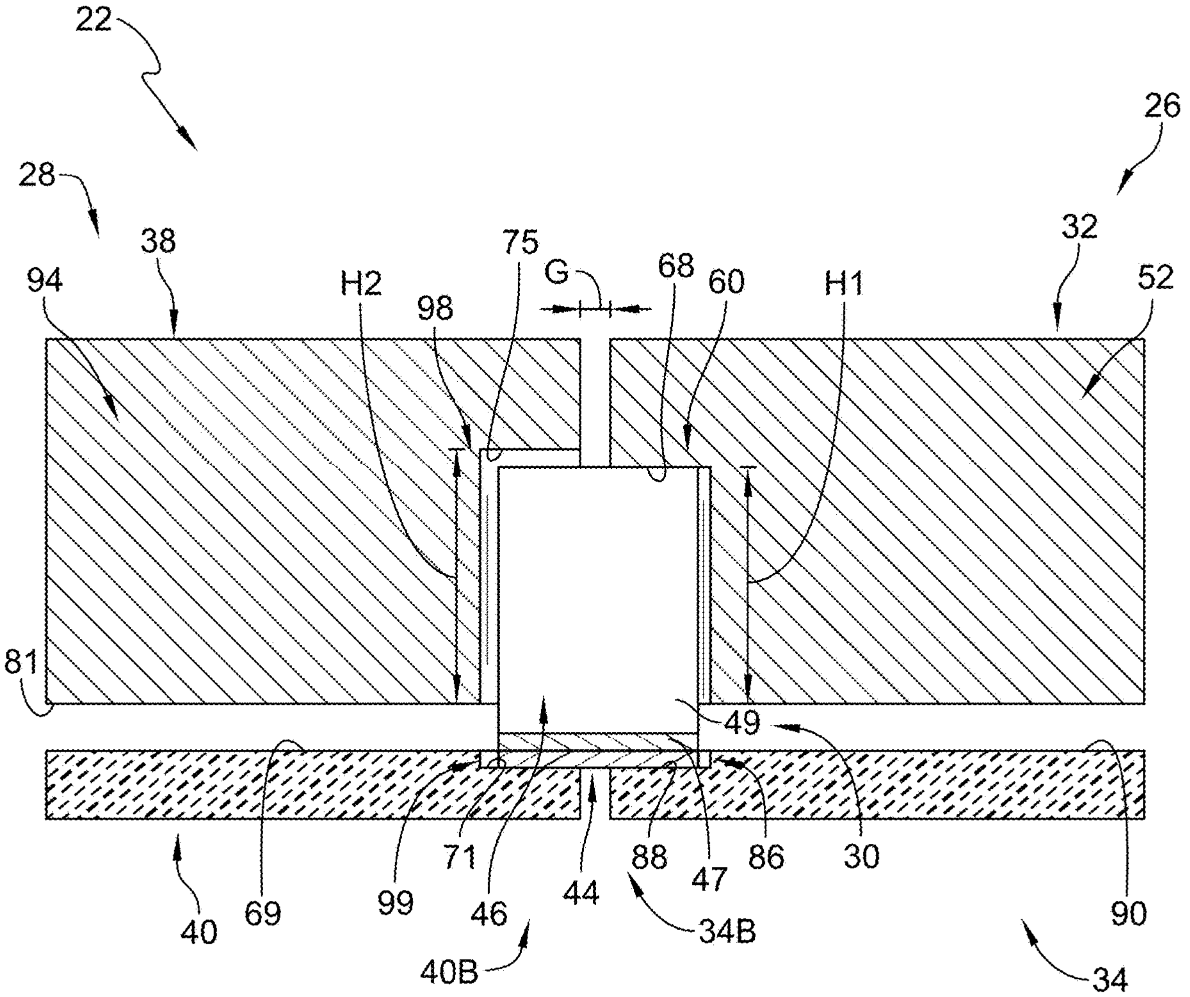
FIG. 6 is a cross-sectional diagrammatic view through the first and second shroud segments as assembled in the turbine shroud assembly of FIG. 1 showing that the first shroud segment and the second shroud segment are assembled adjacent one another and the axial seal member extends circumferentially between the first shroud segment and the second shroud segment, and further showing that the forward seal member extends into a first seal-retaining slot formed in the first flange of the first carrier segment and a second seal-retaining slot formed in the second carrier segment to engage the first seal-retaining slot without engaging the second seal-retaining slot due to height differences between the two slots.

The second shroud segment 28 is arranged circumferentially adjacent the first shroud segment 26 about the central axis 11. A circumferential gap G is formed between the first shroud segment 26 and the second shroud segment 28 as shown in FIG. 6. Though the turbine shroud assembly 22 is shown and described as having two shroud segments 26, 28 and one damping strip seal assembly 30, the turbine shroud assembly 22 includes additional shroud segments and damping strip seal assemblies so that the turbine shroud assembly 22 extends entirely circumferentially about the central axis 11 as shown in FIG. 1.

The first shroud segment 26 includes a first carrier segment 32, a first blade track segment 34, and a first retainer 36 as shown in FIGS. 3 and 4. The first carrier segment 32 is arranged circumferentially at least partway around the central axis 11 and is coupled with the outer case 17 with hook features in the illustrative embodiment. The first blade track segment 34 is supported by the first carrier segment 32 to define a portion of the gas path 25. The first retainer 36 extends axially through the first carrier segment 32 and the first blade track segment 34 to couple the first carrier segment 32 and the first blade track segment 34 together.

The second shroud segment 28 includes a second carrier segment 38, a second blade track segment 40, and a second retainer 42 as shown in FIG. 5. The second carrier segment 38 is arranged circumferentially at least partway around the central axis 11 and is coupled with the outer case 17 with hook features in the illustrative embodiment. The second blade track segment 40 is supported by the second carrier segment 38 to define another portion of the gas path 25. The second retainer 42 extends axially through the second carrier segment 38 and the second blade track segment 40 to couple the second carrier segment 38 and the second blade track segment 40 together.

The damping strip seal assembly 30 extends circumferentially into the first shroud segment 26 and the second shroud segment 28 as shown in FIG. 6 and as suggested in FIG. 5. The damping strip seal assembly 30, along with the other strip seals 102, 104, 106, 108, 110, blocks gases in the gas path 25 from passing radially outward and circumferentially between the first shroud segment 26 and the second shroud segment 28 through the circumferential gap G.

Fluttering of strip seals may be a concern in turbine shroud assemblies. Fluttering movement of a strip seal may reduce the life of the strip seal. To minimize fluttering, and thus, reduce the possibility of failure, the damping strip seal assembly 30 of the present disclosure is urged radially against the blade track segments 34, 40 to dampen any flutter or vibration.

The damping strip seal assembly 30 includes an axial seal member 44, the forward seal member 46, and the aft seal member 48 as shown in FIGS. 3 and 5. The axial seal member 44 extends axially along the first blade track segment 34 and the second blade track segment 40. The forward seal member 46 and the aft seal member 48 each engage the first carrier segment 32 to urge the axial seal member 44 of the damping strip seal assembly 30 radially inward against the first blade track segment 34 and the second blade track segment 40. The urging of the axial seal member 44 against the first blade track segment 34 and the second blade track segment 40 dampens flutter movement of the damping strip seal assembly 30 relative to the first blade track segment 34 and the second blade track segment 40 during use of the turbine shroud assembly 22.

Turning back to the first shroud segment 26, the first carrier segment 32 of the first shroud segment 26 includes a first outer wall 50, a first flange 52, and a second flange 54 as shown in FIG. 3. The first flange 52 extends radially inward from the first outer wall 50. The second flange 54 is axially spaced apart from the first flange 52 and extends radially inward from the first outer wall 50. The first flange 52 is formed to include a first seal-retaining slot 60 as shown in FIGS. 3 and 6. The first seal-retaining slot 60 extends circumferentially into the first flange 52 and is shaped to receive the forward seal member 46 therein. The first seal-retaining slot 60 has a first height H1 as shown in FIG. 6.

The first flange 52 of the first carrier segment 32 includes a first wall 70 formed to include a radially inward facing surface 74 as shown in FIG. 3. The first seal-retaining slot 60 extends axially forward and radially outward into the first flange 52 from the radially inward facing surface 74 to match the curvature of the forward seal member 46. A first protrusion 72 extends radially inward from the first wall 70 axially forward of the first seal-retaining slot 60. The first protrusion 72 is located axially forward of the first blade track segment 34 to cover an axial forward end 34A of the first blade track segment 34. The first protrusion 72 blocks at least a portion of the gases flowing through the gas path 25 from flowing axially into the forward seal member 46 of the damping strip seal assembly 30.

The second flange 54 of the first carrier segment 32 is formed to include a second seal-retaining slot 76 as shown in FIG. 3. The second seal-retaining slot 76 extends circumferentially into the second flange 54 and is shaped to receive the aft seal member 48 therein. The second seal-retaining slot 76 has the first height H1. The second flange 54 of the first carrier segment 32 includes an aft wall 62 formed to include a radially inward facing surface 64 as shown in FIG. 3. The second seal-retaining slot 76 extends axially aft and radially outward into the second flange 54 from the radially inward facing surface 64 to match the curvature of the aft seal member 48.

In some embodiments, the first carrier segment 32 further includes a third flange 56 and a fourth flange 58 as shown in FIG. 3. Each of the third flange 56 and the fourth flange 58 extends radially inward from the first outer wall 50. The third flange 56 is located axially between the first flange 52 and the fourth flange 58. The fourth flange 58 is located axially between the third flange 56 and the second flange 54. The third and fourth flanges 56, 58 may be inner flanges or clevises that are both located axially inward of the first flange 52 and the second flange 54. Each of the flanges 52, 54, 56, and 58 of the first carrier segment 32 is formed to include a hole that receives the first retainer 36 therein as shown in FIGS. 3 and 4. Illustratively, the first carrier segment 32 is made of metallic materials.

The first blade track segment 34 includes a first shroud wall 83 and a first attachment feature 85 that extends radially outward from the first shroud wall 83 as shown in FIGS. 3 and 4. The first shroud wall 83 extends circumferentially partway around the central axis 11. Illustratively, the first attachment feature 85 includes a first attachment flange 85A and a second attachment flange 85B axially aft of the first attachment flange 85A. Each of the attachment flanges 85A, 85B is formed to include a hole that receives the first retainer 36 therein. The first attachment flange 85A is located axially between the first flange 52 and the third flange 56 as shown in FIG. 3. The second attachment flange 85B is located axially between the fourth flange 58 and the second flange 54. Illustratively, the first blade track segment 34 is made of ceramic matrix composite materials.

A circumferential end 34B of the first shroud wall 83 confronts the second blade track segment 40 as shown in FIG. 6. The circumferential end 34B is formed with a first recess 86 that defines a first shoulder 88 of the first blade track segment 34. The first shroud wall 83 slopes radially inwardly at the circumferential end 34B to define the first shoulder 88. The first shroud wall 83 has a first radial outer surface 90 that faces toward the first carrier segment 32. The first radial outer surface 90 is formed on the first shoulder 88. The first radial outer surface 90 is exposed to air located radially between the first carrier segment 32 and the first blade track segment 34. The axial seal member 44 of the damping strip seal assembly 30 slides onto the first radial outer surface 90 of the first shoulder 88 as shown in FIG. 6.

In the illustrative embodiment, the first retainer 36 includes a mount pin 37 and a mount plug 39 as shown in FIG. 4. The first retainer 36 couples the first blade track segment 34 to the first carrier segment 32 as shown in FIGS. 3 and 4. The mount pin 37 extends through the first blade track segment 34 and into the first carrier segment 32. The mount plug 39 fits into the first carrier segment 32 axially aft of the mount pin 37 and circumferentially aligned with the mount pin 37. In the illustrative embodiment, the mount pin 37 includes a forward pin 41 and an aft pin 43 as shown in FIG. 4. The forward pin 41 and the aft pin 43 of the mount pin 37 are circumferentially aligned. The forward pin 41 is located axially forward of the aft pin 43. In this embodiment, the forward pin 41 is separate from the aft pin 43 so as to allow for independent loading during use in the gas turbine engine 10. In some embodiments, the mount pin 37 is formed as a single pin. The mount pin 37 is inserted from an axially aft end of the first shroud segment 26. Though not shown, in the illustrative embodiment, an additional first retainer is included in the first shroud segment 26 spaced apart circumferentially from the first retainer 36 such that the first shroud segment 26 includes two forward pins 41, two aft pins 43, and two mount plugs 39.

The second carrier segment 38 of the second shroud segment 28 includes a second outer wall 92, a fifth flange 94, and a sixth flange 96 as shown in FIG. 5. The fifth flange 94 extends radially inward from the second outer wall 92. The sixth flange 96 is axially spaced apart from the fifth flange 94 and extends radially inward from the second outer wall 92.

The fifth flange 94 is formed to include a third seal-retaining slot 98 as shown in FIGS. 5 and 6. The third seal-retaining slot 98 extends into the fifth flange 94 axially forward and radially outward to receive the forward seal member 46 therein. The third seal-retaining slot 98 has a second height H2 as shown in FIG. 6. The first seal-retaining slot 60 and the third seal-retaining slot 98 are aligned with one another while the first shroud segment 26 and the second shroud segment 28 are assembled adjacent one another. In the illustrative embodiment, the second height H2 of the third seal-retaining slot 98 is greater than the first height H1 of the first seal-retaining slot 60 as shown in FIG. 6.

The fifth flange 94 of the second carrier segment 38 includes a second wall 79 formed to include a radially inward facing surface 81 as shown in FIGS. 5 and 6. The third seal-retaining slot 98 extends radially outward into the fifth flange 94 from the radially inward facing surface 81. A second protrusion 87 extends radially inward from the second wall 79 to cover an axial forward end 40A of the second blade track segment 40.

The sixth flange 96 of the second carrier segment 38 is formed to include a fourth seal-retaining slot 89 as suggested in FIG. 5. The fourth seal-retaining slot 89 is similar to the second seal-retaining slot 76 except that the fourth seal-retaining slot 89 has the second height H2. The second seal-retaining slot 76 and the fourth seal-retaining slot 89 are aligned with one another while the first shroud segment 26 and the second shroud segment 28 are assembled adjacent to one another. In the illustrative embodiment, the second height H2 of the fourth seal-retaining slot 89 is greater than the first height H1 of the second seal-retaining slot 76.

The second carrier segment 38 further includes a seventh flange 91 and an eighth flange 93 as shown in FIG. 5. Each of the seventh flange 91 and the eighth flange 93 extend radially inward from the second outer wall 92. The seventh flange 91 is located axially between the fifth flange 94 and the eighth flange 93. The eighth flange 93 is located axially between the seventh flange 91 and the sixth flange 96. The seventh and eighth flanges 91, 93 may be inner flanges or clevises that are both located axially inward of the fifth flange 94 and the sixth flange 96. Each of the flanges 94, 96, 91, and 93 of the second carrier segment 38 is formed to include a hole that receives the second retainer 42 therein.

The second blade track segment 40 includes a second shroud wall 95 and a second attachment feature 97 that extends radially outward from the second shroud wall 95 as shown in FIG. 5. The second shroud wall 95 extends circumferentially partway around the central axis 11. Illustratively, the second attachment feature 97 includes a third attachment flange 97A and a fourth attachment flange 97B axially aft of the third attachment flange 97A. Each of the attachment flanges 97A, 97B is formed to include a hole that receives the second retainer 42 therein. The third attachment flange 97A is located axially between the fifth flange 94 and the seventh flange 91. The fourth attachment flange 97B is located axially between the eighth flange 93 and the sixth flange 96. Illustratively, the second blade track segment 40 is made of ceramic matrix composite materials.

A circumferential end 40B of the second shroud wall 95 confronts the first blade track segment 34 as shown in FIG. 6. The circumferential end 40B is formed with a second recess 99 that defines a second shoulder 71 of the second blade track segment 40. The second shroud wall 95 slopes radially inwardly at the circumferential end 40B to define the second shoulder 71. The second shroud wall 95 has a second radial outer surface 69 that faces toward the second carrier segment 38. The second radial outer surface 69 is formed on the second shoulder 71. The second radial outer surface 69 is exposed to air located radially between the second carrier segment 38 and the second blade track segment 40. The second retainer 42 is the same as the first retainer 36 such that description of the first retainer 36 also applies to the second retainer 42.

The damping strip seal assembly 30 includes the axial seal member 44, the forward seal member 46, and the aft seal member 48 as shown in FIG. 3. In the illustrative embodiment, the axial seal member 44, the forward seal member 46, and the aft seal member 48 are separate components. The axial seal member 44 is substantially flat relative to the central axis 11. The axial seal member 44 engages the first radial outer surface 90 of the first shoulder 88 and the second radial outer surface 69 of the second shoulder 71 as shown in FIG. 6. A radial inner surface of the axial seal member 44 directly contacts the radial outer surfaces 90, 69 of the blade track segments 34, 40. A radial outer surface 66 of the axial seal member 44 is exposed to air that is radially between the carrier segments 32, 38 and the blade track segments 34, 40. The axial seal member 44 extends axially along the first radial outer surface 90 of the first blade track segment 34 and the second radial outer surface 69 of the second blade track segment 40 and circumferentially between the blade track segments 34, 40 to block the circumferential gap G.

The axial seal member 44 extends between a first axial end 44A and a second axial end 44B as shown in FIG. 3. The first axial end 44A is at least partially axially aligned with the first flange 52 such that the first axial end 44A is located axially aft of the first protrusion 72. The second axial end 44B is located axially aft of the second flange 54. A space radially outward of the axial seal member 44 of the damping strip seal assembly 30, such as the space axially between the third flange 56 and the fourth flange 58, is pressurized. Thus, a high load pushes downwardly on the axial seal member 44 axially between the first axial end 44A and the second axial end 44B.

The first recess 86 of the first blade track segment 34 and the second recess 99 of the second blade track segment 40 retain the axial seal member 44 circumferentially between the first blade track segment 34 and the second blade track segment 40 as suggested in FIG. 6. The axial seal member 44 may slide circumferentially a marginal amount, however, the recesses 86, 99 block the axial seal member 44 from sliding such that the circumferential gap G is no longer blocked. The first protrusion 72 of the first carrier segment 32 and the second protrusion 87 of the second carrier segment 38 retain the axial seal member 44 axially so that the axial seal member 44 cannot escape axially forward as shown in FIG. 3.

The forward seal member 46 extends into the first seal-retaining slot 60 formed in the first flange 52 of the first carrier segment 32 as shown in FIG. 3. The forward seal member 46 includes a first portion 47 and a second portion 49 extending from the first portion 47. The first portion 47 extends along a first curved path axially forward and radially outward away from the axial seal member 44. The first portion 47 engages the radial outer surface 66 of the axial seal member 44 near the first axial end 44A of the axial seal member 44 as shown in FIG. 3. The second portion 49 extends along a first straight path radially outwardly from the first portion 47. In other words, the forward seal member 46 extends along a curved path axially aft (from the second portion 49 to the first portion 47) as the forward seal member 46 extends radially inward toward the axial seal member 44. At least a portion of the first portion 47 and the second portion 49 of the forward seal member 46 extend into the first seal-retaining slot 60.

The forward seal member 46 extends into both of the first seal-retaining slot 60 of the first carrier segment 32 and the third seal-retaining slot 98 of the second carrier segment 38 as shown in FIG. 6. A radially outer end of the second portion 49 contacts a topmost surface 68 of the first seal-retaining slot 60. Because of the height differences (H1 and H2) between the first and the third seal-retaining slots 60, 98, the second portion 49 does not contact a topmost surface 75 of the third seal-retaining slot 98. The engagement between the forward seal member 46 and the first seal-retaining slot 60 applies a force to the axial seal member 44. The force urges the axial seal member 44 of the damping strip seal assembly 30 radially inward against the first and second radial outer surfaces 90, 69 of the blade track segments 34, 40.

The aft seal member 48 extends into the second seal-retaining slot 76 formed in the second flange 54 of the first carrier segment 32 as shown in FIG. 3. The aft seal member 48 includes a first portion 53 and a second portion 55 extending from the first portion 53. The first portion 53 extends along a second curved path axially aft and radially outward away from the axial seal member 44. The first portion 53 engages the radial outer surface 66 of the axial seal member 44. The second portion 55 extends along a second straight path radially outwardly from the first portion 53. At least a portion of the first portion 53 and the second portion 55 of the aft seal member 48 extend into the second seal-retaining slot 76.

The aft seal member 48 extends into both of the second seal-retaining slot 76 of the first carrier segment 32 and the fourth seal-retaining slot 89 of the second carrier segment 38 as suggested in FIG. 5. The aft seal member 48 and the slots 76, 89 have the same configuration as the forward seal member 46 and the slots 60, 98. A radially outer end of the second portion 55 of the aft seal member 48 contacts a topmost surface 78 of the second seal-retaining slot 76. Because of the height differences (H1 and H2) between the second and the fourth seal-retaining slots 76, 89, the second portion 55 does not contact a topmost surface of the fourth seal-retaining slot 89. The engagement between the aft seal member 48 and the second seal-retaining slot 76 urges the axial seal member 44 of the damping strip seal assembly 30 radially inward against the first and second radial outer surfaces 90, 69 of the blade track segments 34, 40.

The seal-retaining slots 60, 98 retain the forward seal member 46 axially and radially relative to the turbine shroud assembly 22 as suggested in FIG. 3. The seal-retaining slots 76, 89 retain the aft seal member 48 axially and radially relative to the turbine shroud assembly 22. As shown in FIGS. 5 and 6, each of the forward seal member 46, the axial seal member 44, and the aft seal member 48 has a substantially similar width.

In some embodiments, the turbine shroud assembly 22 further includes strip seals 102, 104, 106, 108, 110 as shown in FIGS. 3 and 5. Each of the strip seals 102, 104, 106, 108 extends into the first carrier segment 32 and the second carrier segment 38. The strip seal 110 extends into each of the second attachment flange 85B of the first blade track segment 34 and the fourth attachment flange 97B of the second blade track segment 40.

The first carrier segment 32 and the second carrier segment 38 are each formed to include grooves sized to receive the strip seals 102, 104, 106, 108 therein as shown in FIGS. 3 and 5. The second attachment flange 85B of the first blade track segment 34 and the fourth attachment flange 97B of the second blade track segment 40 are each formed to include a groove sized to receive the strip seal 110 therein. The strip seals 102, 104, 106, 108, 110 provide additional sealing between the first shroud segment 26 and the second shroud segment 28.

Figure 7:
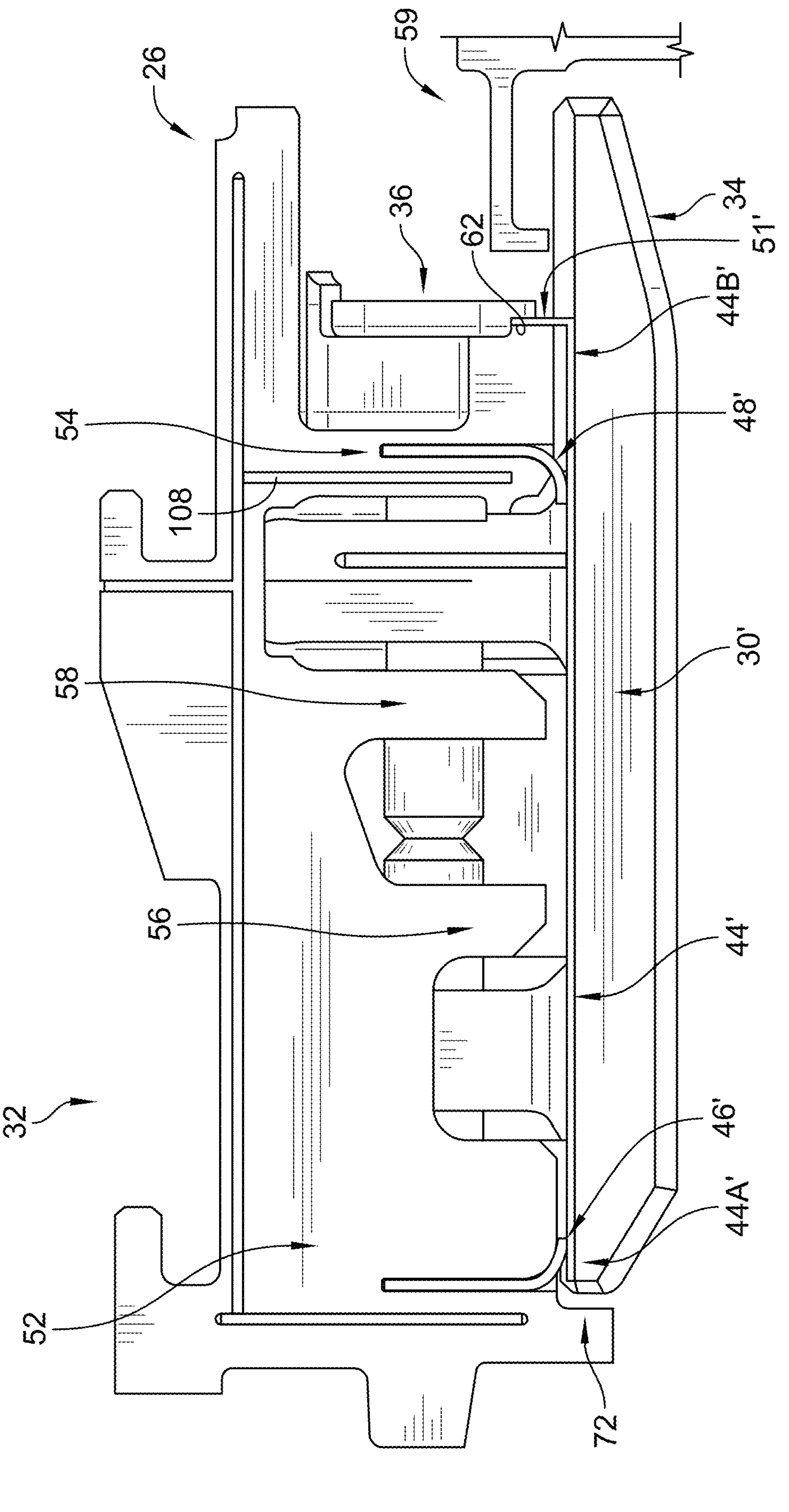
FIG. 7 is a detailed view of another embodiment of damping strip seal assembly included in the strip seals for use with the turbine shroud assembly of FIG. 3 showing that an axial seal member is formed to include a retention tang extending radially outward from an aft end of the axial seal member to engage the second flange of the first carrier segment.

Another embodiment of a damping strip seal assembly 30' in accordance with the present disclosure is shown in FIG. 7. The damping strip seal assembly 30' is substantially similar to the damping strip seal assembly 30 shown in FIGS. 1-6 and described herein. Accordingly, similar reference numbers including a prime indicate features that are common between the damping strip seal assembly 30' and the damping strip seal assembly 30. The description of the damping strip seal assembly 30 is incorporated by reference to apply to the damping strip seal assembly 30', except in instances when it conflicts with the specific description and the drawings of the damping strip seal assembly 30'

A forward seal member 46' is similar to the forward seal member 46 as shown in FIG. 7. An aft seal member 48' is substantially similar to the aft seal member 48, except that the aft seal member 48' extends into the second flange 54 axially aft of the strip seal 108 instead of axially forward of the strip seal 108. The axial seal member 44' extends between a first axial end 44A' and a second axial end 44B'. The first axial end 44A' is at least partially axially aligned with the first flange 52 of the first carrier segment 32 such that the first axial end 44A' is located axially aft of the first protrusion 72. The second axial end 44B' is located axially aft of the second flange 54.

The axial seal member 44' is formed to include a retention tang 51' as shown in FIG. 7. The retention tang 51' extends radially outward from the axial seal member 44' at the second axial end 44B'. Illustratively, the retention tang 51' and the second axial end 44B' of the axial seal member 44' are perpendicular to one another. The retention tang 51' engages the aft wall 62 of the second flange 54. The retention tang 51' also engages an aft wall of the sixth flange 96 of the second carrier segment 38 while the first shroud segment 26 and the second shroud segment 28 are assembled. The retention tang 51' minimizes axially forward movement of the axial seal member 44' relative to the shroud segments 26, 28. A vane 59 is arranged axially aft of the first shroud segment 26. A forward end wall of the vane 59 minimizes axially aft movement of the axial seal member 44' relative to the shroud segments 26, 28. Any of the axial seal members 44, 244, 344, 444, 544 described herein may be formed to include the retention tang 51'.

Figure 8:
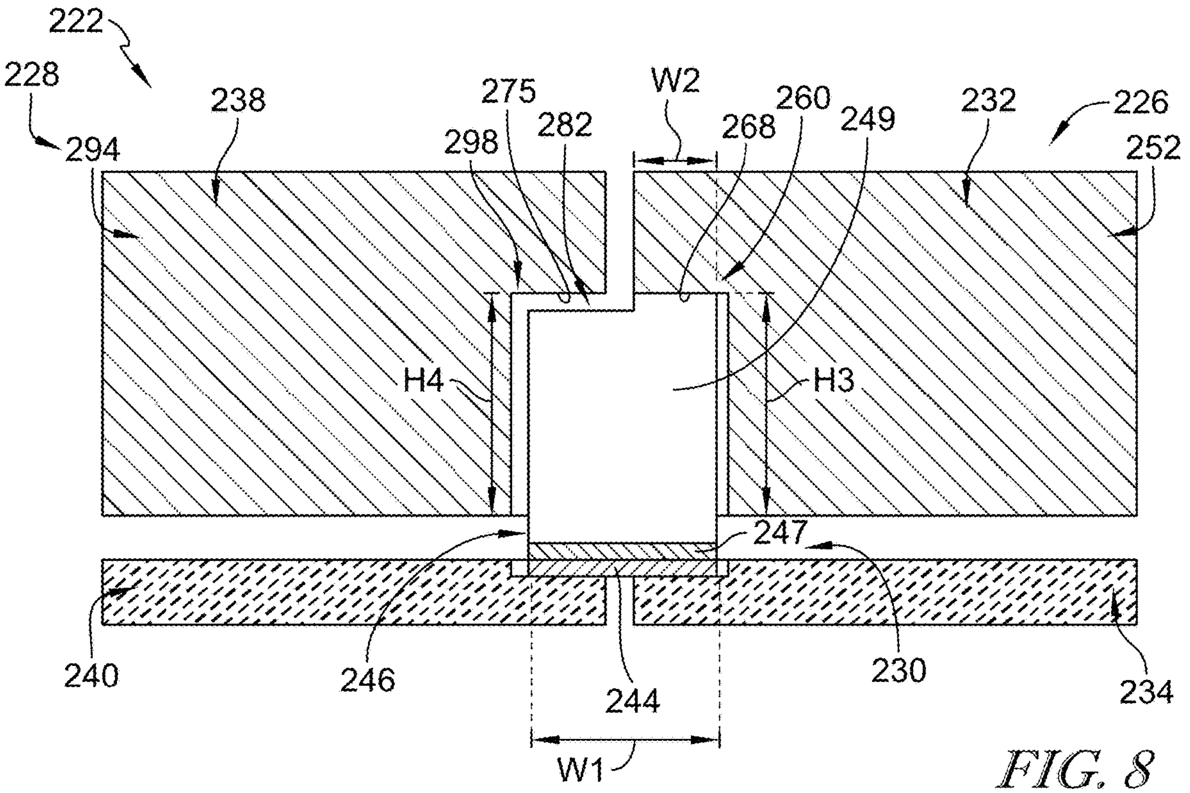
FIG. 8 is a diagrammatic section view of another embodiment of a turbine shroud assembly for use in the gas turbine engine of FIG. 1 showing that a first carrier segment of a first shroud segment is formed to include a first seal-retaining slot and a second carrier segment of a second shroud segment is formed to include a second seal-retaining slot, the first seal-retaining slot and the second seal-retaining slot having substantially similar heights, and further showing that a forward seal member of a damping strip seal assembly is formed to include a notch so that the forward seal member extends into the first seal-retaining slot and the second seal-retaining slot to engage the first carrier segment without engaging the second carrier segment.

Another embodiment of a turbine shroud assembly 222 in accordance with the present disclosure is shown in FIG. 8. The turbine shroud assembly 222 is substantially similar to the turbine shroud assembly 22 shown in FIGS. 1-7 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

As compared to the turbine shroud assembly 22, the turbine shroud assembly 222 includes different slots 298 formed in a second carrier segment 238 and different forward and aft seal members 246 as shown in FIG. 8. The turbine shroud assembly 222 includes a first shroud segment 226, a second shroud segment 228, and a damping strip seal assembly 230.

The first shroud segment 226 includes a first carrier segment 232, a first blade track segment 234, and a first retainer (not shown, but the same as the first retainer 36) as shown in FIG. 8. The second shroud segment 228 includes a second carrier segment 238, a second blade track segment 240, and a second retainer (not shown, but the same as the second retainer 42). The damping strip seal assembly 230 extends into each of the first shroud segment 226 and the second shroud segment 228. The damping strip seal assembly 230 includes an axial seal member 244, a forward seal member 246, and an aft seal member (not shown).

A first flange 252 of the first carrier segment 232 is formed to include a first seal-retaining slot 260 sized to receive at least a portion of the forward seal member 246 therein as shown in FIG. 8. The first seal-retaining slot 260 has a third height H3. Illustratively, the first seal-retaining slot 260 is the same as the first seal-retaining slot 60. A second flange of the first carrier segment 232 is formed to include a second seal-retaining slot having the third height H3 (the same as the second seal-retaining slot 76). Illustratively, the first blade track segment 234 is the same as the first blade track segment 34.

A fifth flange 294 of the second carrier segment 238 is formed to include a third seal-retaining slot 298 as shown in FIG. 8. The third seal-retaining slot 298 has a fourth height H4. The first seal-retaining slot 260 and the third seal-retaining slot 298 are aligned with one another while the first shroud segment 226 and the second shroud segment 228 are assembled adjacent one another 8. In the illustrative embodiment, the fourth height H4 of the third seal-retaining slot 298 is substantially equal to the third height H3 of the first seal-retaining slot 260 as shown in FIG. 8. A sixth flange of the second carrier segment 238 is formed to include a fourth seal-retaining slot having the fourth height H4 (the same as the fourth seal-retaining slot 89 with the fourth height H4). Illustratively, the second blade track segment 240 is the same as the second blade track segment 40.

The axial seal member 244 of the damping strip seal assembly 230 extends axially along the first blade track segment 234 and the second blade track segment 240 and circumferentially between the blade track segments 234, 240 as shown in FIG. 8. The axial seal member 244 has a first width W1.

The forward seal member 246 includes a first portion 247 and a second portion 249 extending radially outward from the first portion 247 as shown in FIG. 8 and as described in relation to the forward seal member 46. The second portion 249 of the forward seal member 246 is formed to include a notch 282 extending radially inwardly from a radial outer end of the forward seal member 246. The notch 282 extends at least partially into the second portion 249 toward the first portion 247 of the forward seal member 246. In other words, at least a portion of the forward seal member 246 has a second width W2. The second width W2 is less than the first width W1 of the axial seal member 244 as shown in FIG. 8.

In some embodiments, the forward seal member 246 extends into the first seal-retaining slot 260 and into the third seal-retaining slot 298 as shown in FIG. 8. The forward seal member 246 contacts a topmost surface 268 of the first seal-retaining slot 260 without contacting a topmost surface 275 of the third seal-retaining slot 298. Though not shown, the aft seal member is configured the same as the forward seal member 246 such that the aft seal member is formed to include a notch so that the aft seal member only contacts the second seal-retaining slot of the first carrier segment 232 without contacting the fourth seal-retaining slot of the second carrier segment 238.

Figure 9:
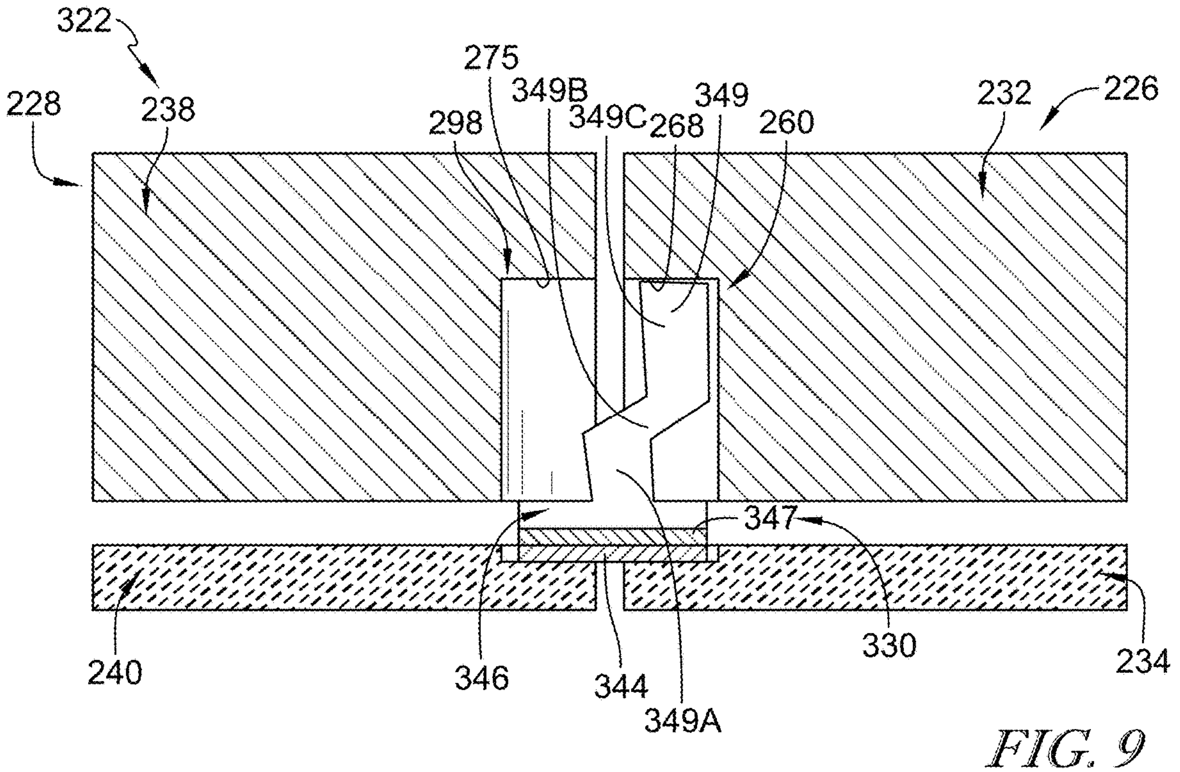
FIG. 9 is a diagrammatic section view of the first shroud segment and the second shroud segment of FIG. 8 including an alternative damping strip seal assembly, the damping strip seal assembly having a forward seal member that extends into both of the first seal-retaining slot and the second seal-retaining slot while only engaging the first carrier segment.

Another embodiment of a damping strip seal assembly 330 for use with the first shroud segment 226 and the second shroud segment 228 of FIG. 8 is shown in FIG. 9. The damping strip seal assembly 330 is substantially similar to the damping strip seal assembly 30 shown in FIGS. 1-6 and described herein and the damping strip seal assembly 230 shown in FIG. 8 and described herein. Accordingly, similar reference numbers in the 300 series indicate features that are common between the damping strip seal assembly 30, the damping strip seal assembly 230, and the damping strip seal assembly 330. The descriptions of the damping strip seal assembly 30 and the damping strip seal assembly 230 are incorporated by reference to apply to the damping strip seal assembly 330, except in instances when it conflicts with the specific description and the drawings of the damping strip seal assembly 330.

The damping strip seal assembly 330 includes an axial seal member 344, a forward seal member 346, and an aft seal member as shown in FIG. 9. The axial seal member 344 is similar to the axial seal member 244.

The forward seal member 346 includes a first portion 347 and a second portion 349 extending radially outward from the first portion 347 as shown in FIG. 9 and as described in relation to the forward seal member 46. The second portion 349 of the forward seal member 346 is defined by a first radial portion 349A, a circumferential portion 349B, and a second radial portion 349C.

The first radial portion 349A extends radially outward away from the first portion 347 of the forward seal member 346 as shown in FIG. 9. The circumferential portion 349B extends circumferentially relative to the first radial portion 349A. The circumferential portion 349B extends from the first radial portion 349A toward the first carrier segment 232. The second radial portion 349C extends radially outward from the circumferential portion 349B. The first radial portion 349A and the circumferential portion 349B extend into both of the first seal-retaining slot 260 and the third seal-retaining slot 298. The second radial portion 349C engages the topmost surface 268 of the first seal-retaining slot 260.

Illustratively, the second radial portion 349C extends into the first seal-retaining slot 260 without extending into the third seal-retaining slot 298 so that only the first carrier segment 232 is engaged by the second radial portion 349C as shown in FIG. 9. The forward seal member 346 contacts the topmost surface 268 of the first seal-retaining slot 260 without contacting the topmost surface 275 of the third seal-retaining slot 298.

Though not shown, the aft seal member is configured similarly to the forward seal member 346 such that the aft seal member only contacts the second seal-retaining slot of the first carrier segment 232 without contacting the fourth seal-retaining slot of the second carrier segment 238. The forward seal member 346 (and the aft seal member) may be any shape that allows the forward seal member 346 to extend into each of the slots 260, 298, while only engaging the first seal-retaining slot 260.

Figure 10:
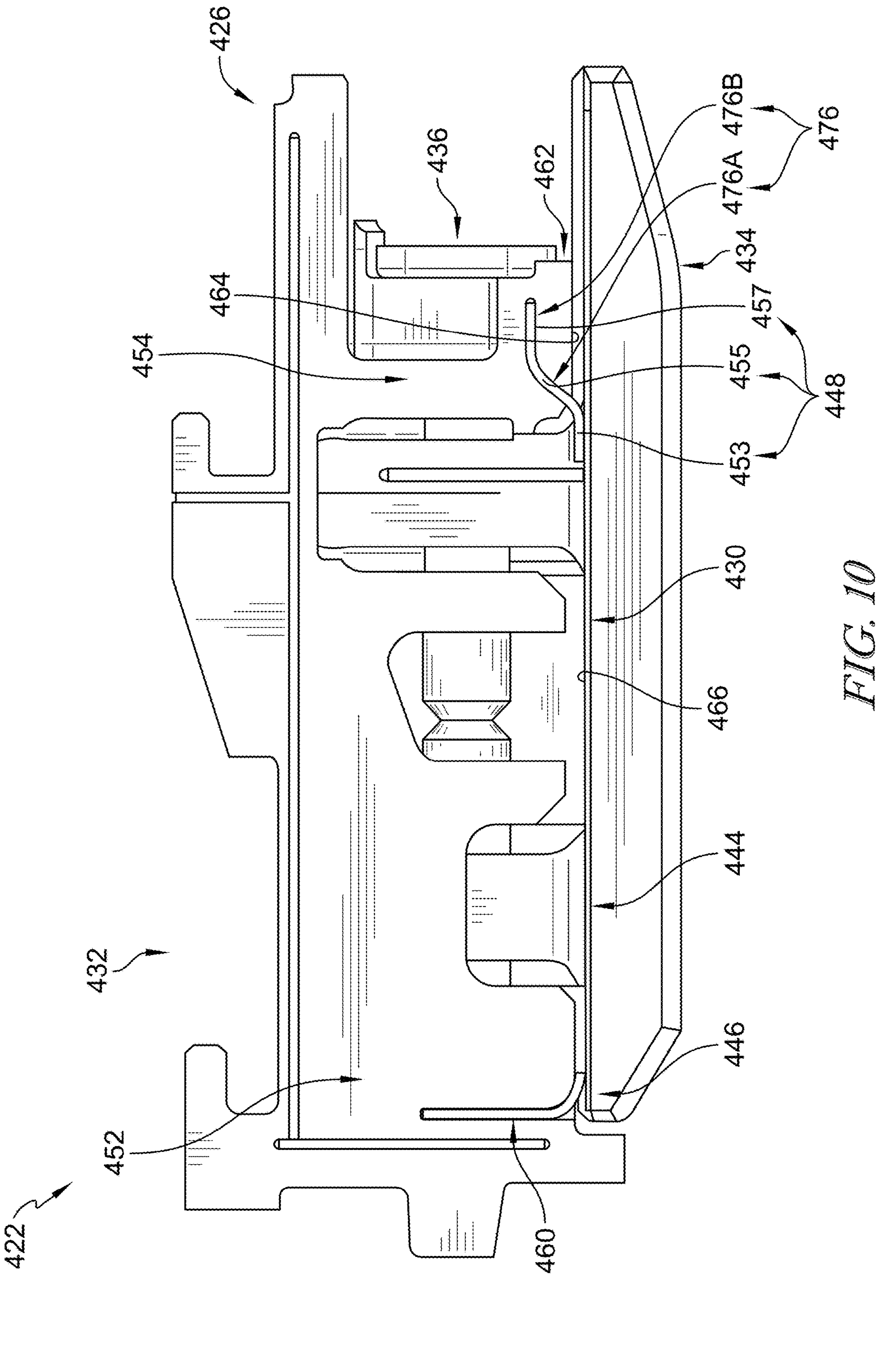
FIG. 10 is a detailed view of another embodiment of a turbine shroud assembly for use in the gas turbine engine of FIG. 1 showing that an s-shaped aft seal member of a damping strip seal assembly is defined by a first axially-extending portion that engages an axial seal member of the damping strip seal assembly, a curved portion that extends radially outward and axially aft from the first axially-extending portion, and a second axially-extending portion that extends axially aft from the curved portion into a first carrier segment.

Another embodiment of a turbine shroud assembly 422 in accordance with the present disclosure is shown in FIG. 10. The turbine shroud assembly 422 is substantially similar to the turbine shroud assembly 22 shown in FIGS. 1-6 and described herein, the turbine shroud assembly 222 shown in FIG. 8 and described herein, and the turbine shroud assembly 322 shown in FIG. 9 and described herein. Accordingly, similar reference numbers in the 400 series indicate features that are common between the turbine shroud assembly 22, the turbine shroud assembly 222, the turbine shroud assembly 322, and the turbine shroud assembly 422. The descriptions of the turbine shroud assembly 22, the turbine shroud assembly 222, and the turbine shroud assembly 322 are incorporated by reference to apply to the turbine shroud assembly 422, except in instances when it conflicts with the specific description and the drawings of the turbine shroud assembly 422. The turbine shroud assembly 422, as compared to the turbine shroud assembly 22, is similar expect for a different aft seal member 448 of a damping strip seal assembly 430, a different second seal-retaining slot 476 formed in a first carrier segment 432, and a different fourth seal-retaining slot formed in a second carrier segment.

A first shroud segment 426 of the turbine shroud assembly 422 includes the first carrier segment 432, a first blade track segment 434, and a first retainer 436 as shown in FIG. 10. The first carrier segment 432 a first flange 452 and a second flange 454. The first flange 452 is formed to include a first seal-retaining slot 460 that is similar is to the first seal-retaining slot 60.

The second flange 454 of the first carrier segment 432 is formed to include a second seal-retaining slot 476 as shown in FIG. 10. The second seal-retaining slot 476 extends circumferentially into the second flange 454 and is shaped to receive the aft seal member 448 therein.

The second flange 454 of the first carrier segment 432 includes an aft wall 462 formed to include a radially inward facing surface 464 as shown in FIG. 10. A first portion 476A of the second seal-retaining slot 476 extends axially aft and radially outward into the second flange 454 from the radially inward facing surface 464. A second portion 476B of the second seal-retaining slot 476 extends axially aft from the first portion 476A to match the curvature of the aft seal member 448. The second portion 476B of the second seal-retaining slot 476 extends substantially parallel to the axial seal member 444.

The first blade track segment 434 is similar to the first blade track segment 34, and the first retainer 436 is similar to the first retainer 36. An axial seal member 444 and a forward seal member 446 are similar to the axial seal member 44 and the forward seal member 46, respectively.

The aft seal member 448 extends into the second seal-retaining slot 476 formed in the second flange 454 of the first carrier segment 432 as shown in FIG. 10. The aft seal member 448 is defined by a first axially-extending portion 453, a curved portion 455, and a second axially-extending portion 457. The first axially-extending portion 453 engages a radial outer surface 466 of the axial seal member 444. The first axially-extending portion 453 is substantially parallel to the axial seal member 444. The curved portion 455 extends radially outward and axially aft from the first axially-extending portion 453. The second axially-extending portion 457 extends axially aft from the curved portion 455. The second axially-extending portion 457 is substantially parallel to the axial seal member 444. At least a portion of the curved portion 455 and the second axially-extending portion 457 extend into the second seal-retaining slot 476 formed in the second flange 454. Illustratively, the aft seal member 448 is S-shaped.

The fourth seal-retaining slot is similar to the second seal-retaining slot 476 such that the fourth seal-retaining slot matches the shape of the aft seal member 448. In some embodiments, a height of the second portion 476B of the second seal-retaining slot 476 may be less than a height of the second portion of the fourth seal-retaining slot, similar to the slots described in relation to FIG. 6. In some embodiments, the aft seal member 448 may be formed to include a notch and the second portion 476B of the second seal-retaining slot 476 and the second portion of the fourth seal-retaining slot may have the same height, similar to the slots described in relation to FIG. 8.

Figure 11:
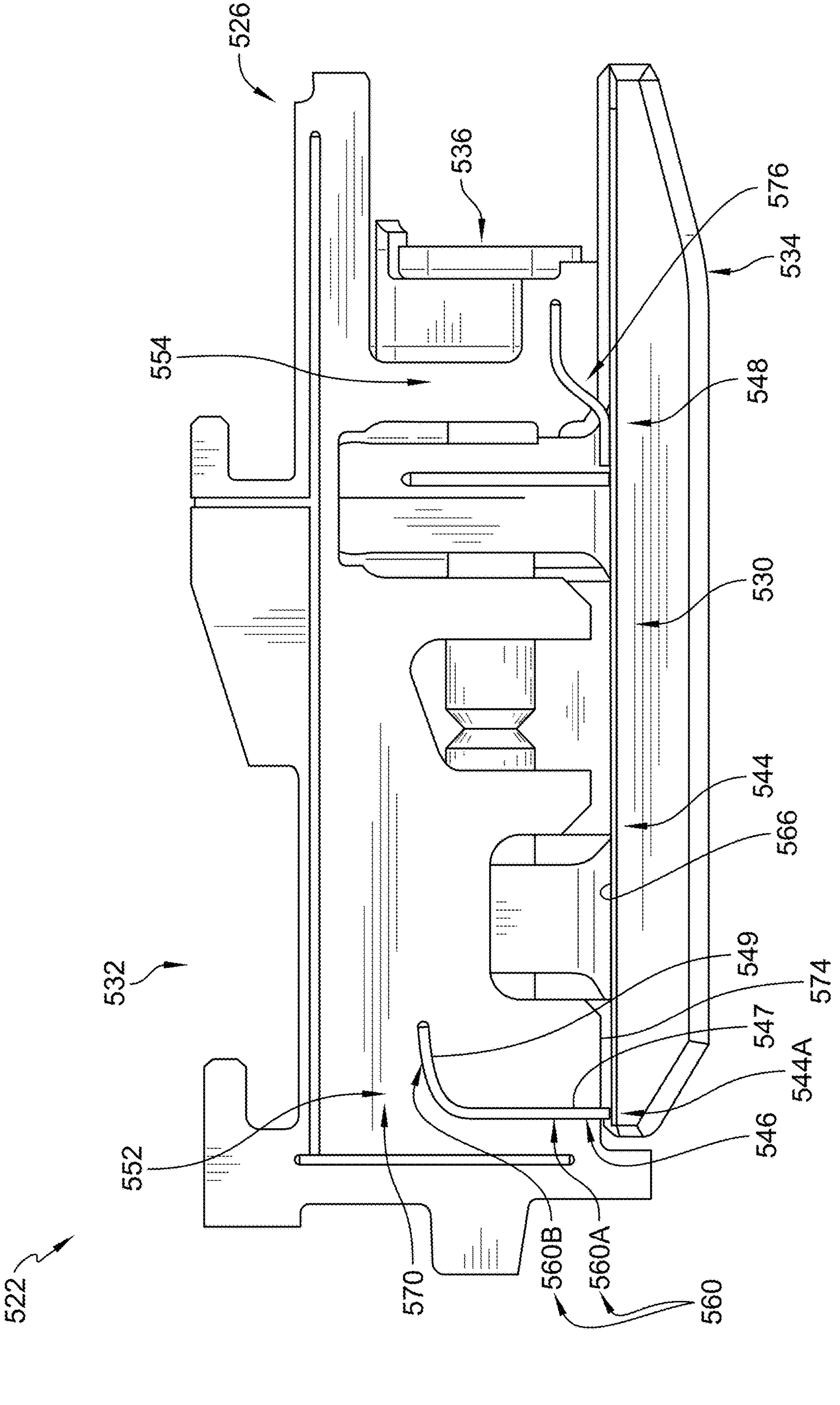
FIG. 11 is a detailed view of another embodiment of a turbine shroud assembly for use in the gas turbine engine of FIG. 1 showing that a forward seal member of a damping strip seal assembly is defined by a first portion that extends straight radially outwardly away from an axial seal member of the damping strip seal assembly and a second portion that extends along a curved path radially outward and axially aft from the first portion into a first carrier segment.

Another embodiment of a turbine shroud assembly 522 in accordance with the present disclosure is shown in FIG. 11. The turbine shroud assembly 522 is substantially similar to the turbine shroud assembly 22 shown in FIGS. 1-6 and described herein, the turbine shroud assembly 222 shown in FIG. 8 and described herein, the turbine shroud assembly 322 shown in FIG. 9 and described herein, and the turbine shroud assembly 422 show in FIG. 10 and described herein. Accordingly, similar reference numbers in the 500 series indicate features that are common between the turbine shroud assemblies 22, 222, 322, 422, 522. The descriptions of the turbine shroud assemblies 22, 222, 322, 422 are incorporated by reference to apply to the turbine shroud assembly 522, except in instances when it conflicts with the specific description and the drawings of the turbine shroud assembly 522. The turbine shroud assembly 522, as compared to the turbine shroud assembly 422, is similar expect for a different forward seal member 546 of a damping strip seal assembly 530, a different first seal-retaining slot 560 formed in a first carrier segment 532, and a different third seal-retaining slot formed in a second carrier segment.

A first shroud segment 526 of the turbine shroud assembly 522 includes the first carrier segment 532, a first blade track segment 534, and a first retainer 536 as shown in FIG. 11. The first carrier segment 532 includes a first flange 552 and a second flange 554. The first flange 552 is formed to include a first seal-retaining slot 560. The first seal-retaining slot 560 extends circumferentially into the first flange 552 and is shaped to receive the forward seal member 546 therein.

The first flange 552 of the first carrier segment 532 includes a first wall 570 formed to include a radially inward facing surface 574 as shown in FIG. 11. The first seal-retaining slot 560 extends radially outward and axially aft into the first flange 552 from the radially inward facing surface 574 to match the curvature of the forward seal member 546. As shown in FIG. 11, a first portion 560A of the first seal-retaining slot 560 extends straight radially outwardly into the first flange 552 and a second portion 560B of the first seal-retaining slot 560 extends and curves radially outwardly and axially aft from the first portion 560A.

The second flange 554 of the first carrier segment 532 is formed to include a second seal-retaining slot 576 that is the same as the second seal-retaining slot 476 as shown in FIG. 11. The first blade track segment 534 is similar to the first blade track segment 34, and the first retainer 536 is similar to the first retainer 36. An axial seal member 544 is similar to the axial seal member 44, and an aft seal member 548 is similar to the aft seal member 448.

The forward seal member 546 extends into the first seal-retaining slot 560 formed in the first flange 552 of the first carrier segment 532 as shown in FIG. 11. The forward seal member 546 includes a first portion 547 and a second portion 549 extending axially aft from the first portion 547. The first portion 547 extends along a first straight path radially outwardly away from a first axial end 544A of the axial seal member 544. The second portion 549 extends along a first curved path radially outward and axially aft from the first portion 547. The first portion 547 engages a radial outer surface 566 of the axial seal member 544 near a first axial end 544A of the axial seal member 544 as shown in FIG. 11. At least a portion of the first portion 547 and the second portion 549 extend into the first seal-retaining slot 560.

The third seal-retaining slot formed in the second carrier segment is similar to the first seal-retaining slot 560. In some embodiments, a height of the second portion 560B of the first seal-retaining slot 560 may be less than a height of a second portion of the third seal-retaining slot, similar to the slots described in relation to FIG. 6. In some embodiments, the forward seal member 546 may be formed to include a notch and the second portion 560B of the first seal-retaining slot 560 and the second portion of the third seal-retaining slot may have the same height, similar to the slots described in relation to FIG. 8.

A method of assembling the turbine shroud assembly 22, 222, 322, 422, 522 for use with the gas turbine engine 10 is provided herein. The method includes assembling the first shroud segment 26, 226, 426, 526 by coupling the first blade track segment 34, 234, 434, 534 with the first carrier segment 32, 232, 432, 532 to support the first blade track segment 34, 234, 434, 534 radially inward of the first carrier segment 32, 232, 432, 532. The method includes assembling the second shroud segment 28, 228 by coupling the second blade track segment 40, 240 with the second carrier segment 38, 238 to support the second blade track segment 40, 240 radially inward of the second carrier segment 38, 238.

The method includes providing the damping strip seal assembly 30, 30', 230, 330, 430, 540 that includes the axial seal member 44, 44', 244, 344, 444, 544, the forward seal member 46, 46', 246, 346, 446, 546, and the aft seal member 48, 48', 448, 548. The method includes locating the axial seal member 44, 44', 244, 344, 444, 544 of the damping strip seal assembly 30, 30', 230, 330, 430, 540 on the first radial outer surface 90 of the first blade track segment 34, 234, 434, 534 and the second radial outer surface 69 of the second blade track segment 40, 240.

The method includes sliding the forward seal member 46, 46', 246, 346, 446, 546 of the damping strip seal assembly 30, 30', 230, 330, 430, 540 into the first seal-retaining slot 60, 260, 460, 560 formed in the first flange 52, 252, 452, 552 of the first carrier segment 32, 232, 432, 532 so that the forward seal member 46, 46', 246, 346, 446, 546 engages the first flange 52, 252, 452, 552 of the first carrier segment 32, 232, 432, 532. The method includes sliding the aft seal member 48, 48', 448, 548 of the damping strip seal assembly 30, 30', 230, 330, 430, 540 into the second seal-retaining slot 76, 476, 576 formed in the second flange 54, 454, 554 of the first carrier segment 32, 232, 432, 532 so that the aft seal member 48, 48', 448, 548 engages the second flange 54, 454, 554 of the first carrier segment 32, 232, 432, 532.

The method includes urging the axial seal member 44, 44', 244, 344, 444, 544 of the damping strip seal assembly 30, 30', 230, 330, 430, 540 radially inward against the first blade track segment 34, 234, 434, 534 and the second blade track segment 40, 240 through engagement of the forward seal member 46, 46', 246, 346, 446, 546 with the first flange 52, 252, 452, 552 and the aft seal member 48, 48', 448, 548 with the second flange 54, 454, 554. The method includes inserting the first retainer 36, 436, 536 axially forward through the first carrier segment 32, 232, 432, 532 and the first blade track segment 34, 234, 434, 534 so as to couple the first blade track segment 34, 234, 434, 534 with the first carrier segment 32, 232, 432, 532.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising:

a first shroud segment including a first carrier segment arranged circumferentially at least partway around a central axis and a first blade track segment supported by the first carrier segment to define a portion of a gas path of the turbine shroud assembly, the first carrier segment having a first outer wall, a first flange that extends radially inward from the first outer wall, and a second flange axially spaced apart from the first flange and extending radially inward from the first outer wall, a second shroud segment arranged circumferentially adjacent the first shroud segment about the central axis, the second shroud segment including a second carrier segment and a second blade track segment supported by the second carrier segment to define another portion of the gas path of the turbine shroud assembly, the second carrier segment having a second outer wall, a first flange that extends radially inward from the second outer wall, and a second flange axially spaced apart from the first flange of the second carrier segment and extending radially inward from the second outer wall, and a damping strip seal assembly extending circumferentially into the first shroud segment and the second shroud segment to block gases from passing radially between the first shroud segment and the second shroud segment, the damping strip seal assembly including an axial seal member that extends axially along a first radial outer surface of the first blade track segment and a second radial outer surface of the second blade track segment, a forward seal member that extends into the first flange of the first carrier segment and engages the axial seal member, and an aft seal member that extends into the second flange of the first carrier segment and engages the axial seal member such that the forward seal member and the aft seal member urge the axial seal member radially inward against the first blade track segment and the second blade track segment to dampen flutter movement of the axial seal member.

2. The turbine shroud assembly of claim 1, wherein the forward seal member includes a first portion that engages a radial outer surface of the axial seal member and a second portion that extends radially outward from the first portion into a first seal-retaining slot formed in the first flange of the first carrier segment, the first portion extending along a first curved path axially forward and radially outward and the second portion extending along a first straight path radially outward from the first portion.

3. The turbine shroud assembly of claim 2, wherein the aft seal member includes a first portion that engages the radial outer surface of the axial seal member and a second portion that extends radially outward from the first portion into a second seal-retaining slot formed in the second flange of the first carrier segment, the first portion extending along a second curved path axially aft and radially outward and the second portion extending along a second straight path radially outward from the first portion.

4. The turbine shroud assembly of claim 1, wherein the axial seal member is formed to include a retention tang extending radially outward from the axial seal member at an aft end of the axial seal member to engage an aft wall of the second flange of the first carrier segment.

5. The turbine shroud assembly of claim 1, wherein the forward seal member extends along a first curved path axially aft as the forward seal member extends radially inward toward the axial seal member, and wherein the aft seal member is S-shaped and defined by a first axially-extending portion that engages a radial outer surface of the axial seal member, a curved portion that extends radially outward and axially aft from the first axially-extending portion, and a second axially-extending portion that extends axially aft from the curved portion, and wherein at least a portion of the curved portion and the second axially-extending portion extend into the second flange of the first carrier segment.

6. The turbine shroud assembly of claim 1, wherein the forward seal member includes a first portion that extends along a first straight path radially outwardly away from the axial seal member and a second portion that extends along a curved path radially outward and axially aft from the first portion, and wherein the aft seal member is S-shaped and defined by a first axially-extending portion that engages a radial outer surface of the axial seal member, a curved portion that extends radially outward and axially aft from the first axially-extending portion, and a second axially-extending portion that extends axially aft from the curved portion, and wherein at least a portion of the curved portion and the second axially-extending portion extend into the second flange of the first carrier segment.

7. The turbine shroud assembly of claim 1, wherein at least a portion of the forward seal member extends into the first flange of the first carrier segment and into the first flange of the second carrier segment, and a radially outer end of the forward seal member engages the first flange of the first carrier segment without engaging the first flange of the second carrier segment.

8. The turbine shroud assembly of claim 1, wherein the first flange of the first carrier segment includes a first wall and a first protrusion that extends radially inward from the first wall to cover a first axial end of the first blade track segment, the first wall is formed to include a radial inward facing surface and a first seal-retaining slot extends radially outward into the first flange of the first carrier segment from the radially inward facing surface to receive at least a portion of the forward seal member therein.

9. The turbine shroud assembly of claim 1, wherein the first carrier segment includes a third flange that extends radially inward from the first outer wall and a fourth flange axially spaced apart from the third flange and extending radially inward from the first outer wall, the third flange is located axially between the first flange and the fourth flange and the fourth flange is located axially between the third flange and the second flange, wherein the first shroud segment includes a first retainer that extends through the first carrier segment and through the first blade track segment so as to couple the first blade track segment to the first carrier segment.

10. The turbine shroud assembly of claim 1, wherein the first blade track segment includes a first shroud wall that extends circumferentially partway around the central axis and a first attachment feature that extends radially outward from the first shroud wall, wherein a circumferential end of the first shroud wall is formed with a first recess to define a first shoulder that provides the first radial outer surface of the first blade track segment, the second blade track segment includes a second shroud wall that extends circumferentially partway around the central axis and a second attachment feature that extends radially outward from the second shroud wall, wherein a circumferential end of the second shroud wall is formed with a second recess to define a second shoulder that provides the second radial outer surface of the second blade track segment, and wherein the axial seal member of the damping strip seal assembly engages the first shoulder and the second shoulder.

11. A turbine shroud assembly for use with a gas turbine engine, the turbine shroud assembly comprising:

a first shroud segment including a first carrier segment arranged circumferentially at least partway around a central axis and a first blade track segment coupled with the first carrier segment to define a portion of a gas path of the turbine shroud assembly, the first carrier segment having an outer wall, a first flange that extends radially inward from the outer wall, and a second flange axially spaced apart from the first flange and extending radially inward from the outer wall, a second shroud segment including a second carrier segment arranged circumferentially at least partway around a central axis and a second blade track segment supported by the second carrier segment, and a damping strip seal assembly including an axial seal member that engages a radial outer surface of the first blade track segment, a forward seal member that extends into the first flange of the first carrier segment and engages a radial outer surface of the axial seal member, and an aft seal member that extends into the second flange of the first carrier segment and engages the radial outer surface of the axial seal member to urge the axial seal member radially inward toward the radial outer surface of the first blade track segment.

12. The turbine shroud assembly of claim 11, wherein the forward seal member includes a first portion that engages the radial outer surface of the axial seal member and a second portion that extends radially outward from the first portion, the first portion extending along a first curved path axially forward and radially outward and the second portion extending along a first straight path radially outward from the first portion.

13. The turbine shroud assembly of claim 12, wherein the aft seal member includes a first portion that engages the radial outer surface of the axial seal member and a second portion that extends radially outward from the first portion, the first portion extending along a second curved path axially aft and radially outward and the second portion extending along a second straight path radially outward from the first portion.

14. The turbine shroud assembly of claim 11, wherein the axial seal member is formed to include a retention tang extending radially outward from the axial seal member at an aft end of the axial seal member to engage an aft wall of the second flange of the first carrier segment.

15. The turbine shroud assembly of claim 11, wherein the forward seal member extends along a first curved path axially aft as the forward seal member extends radially inward toward the axial seal member, and wherein the aft seal member is defined by a first axially-extending portion that engages the radial outer surface of the axial seal member, a curved portion that extends radially outward and axially aft from the first axially-extending portion, and a second axially-extending portion that extends axially aft from the curved portion, and wherein at least a portion of the curved portion and the second axially-extending portion extend into the second flange of the first carrier segment.

16. The turbine shroud assembly of claim 11, wherein the forward seal member includes a first portion that extends along a first straight path radially outwardly away from the axial seal member and a second portion that extends along a curved path radially outward and axially aft from the first portion, and wherein the aft seal member is defined by a first axially-extending portion that engages the radial outer surface of the axial seal member, a curved portion that extends radially outward and axially aft from the first axially-extending portion, and a second axially-extending portion that extends axially aft from the curved portion, and wherein at least a portion of the curved portion and the second axially-extending portion extend into the second flange of the first carrier segment.

17. The turbine shroud assembly of claim 11, wherein the first flange of the first carrier segment includes a first wall and a first protrusion that extends radially inward from the first wall to cover a first axial end of the first blade track segment, the first wall is formed to include a radial inward facing surface and a first seal-retaining slot extends radially outward into the first flange of the first carrier segment from the radially inward facing surface to receive at least a portion of the forward seal member therein.

18. A method of assembling a turbine shroud assembly for use with a gas turbine engine comprising:

assembling a first shroud segment by coupling a first blade track segment with a first carrier segment to support the first blade track segment radially inward of the first carrier segment, assembling a second shroud segment by coupling a second blade track segment with a second carrier segment to support the second blade track segment radially inward of the second carrier segment, providing a damping strip seal assembly that includes an axial seal member, a forward seal member, and an aft seal member, locating the axial seal member of the damping strip seal assembly on a first radial outer surface of the first blade track segment and a second radial outer surface of the second blade track segment, sliding the forward seal member of the damping strip seal assembly into a first seal-retaining slot formed in a first flange of the first carrier segment so that the forward seal member engages the first flange of the first carrier segment and a radial outer surface of the axial seal member, sliding the aft seal member of the damping strip seal assembly into a second seal-retaining slot formed in a second flange of the first carrier segment so that the aft seal member engages the second flange of the first carrier segment and the radial outer surface of the axial seal member, and urging the axial seal member of the damping strip seal assembly radially inward against the first blade track segment and the second blade track segment through engagement of the forward seal member with the first flange and the axial seal member and the aft seal member with the second flange and the axial seal member.

19. The method of claim 18, further comprising inserting a first retainer axially forward through the first carrier segment and the first blade track segment so as to couple the first blade track segment with the first carrier segment.

* * * * *